United States Patent
Mistkawi et al.

(10) Patent No.: US 11,093,725 B2
(45) Date of Patent: Aug. 17, 2021

(54) FINGER WEARABLE SCANNER AND RELATED METHODS

(71) Applicant: Datalogic USA, Inc., Eugene, OR (US)

(72) Inventors: Joseph Mistkawi, Tigard, OR (US); Robert Rudeen, Monroe, CT (US); Mattia Gaglione, Lippo di Calderara di Reno (IT)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 16/802,450

(22) Filed: Feb. 26, 2020

(65) Prior Publication Data

US 2020/0272801 A1 Aug. 27, 2020

Related U.S. Application Data

(60) Provisional application No. 62/810,899, filed on Feb. 26, 2019.

(51) Int. Cl.
*G06K 7/10* (2006.01)
*G06K 7/14* (2006.01)

(52) U.S. Cl.
CPC . *G06K 7/1408* (2013.01); *G06K 2007/10524* (2013.01)

(58) Field of Classification Search
CPC ..... G06K 2007/10524; G06K 7/10891; G06K 7/1408
See application file for complete search history.

(56) References Cited

U.S. PATENT DOCUMENTS

| | | | |
|---|---|---|---|
| 5,212,372 A | 5/1993 | Quick et al. | |
| 5,329,106 A * | 7/1994 | Hone | G06K 7/10891 235/462.44 |
| 5,410,140 A | 4/1995 | Bard et al. | |
| 5,578,810 A | 11/1996 | Bard et al. | |
| 5,610,386 A | 3/1997 | Ball et al. | |
| 6,003,774 A | 12/1999 | Bard et al. | |
| 6,375,079 B1 | 4/2002 | Swartz | |
| 6,634,558 B1 | 10/2003 | Patel et al. | |
| 6,832,724 B2 | 12/2004 | Yavid et al. | |
| 7,764,488 B2 | 7/2010 | Calvarese | |
| 7,991,654 B1 * | 8/2011 | Sacks | G06F 3/0346 705/28 |
| 9,679,180 B2 | 6/2017 | Lim et al. | |

(Continued)

FOREIGN PATENT DOCUMENTS

DE 102018105578 A1 9/2019
WO 2019126236 A1 6/2019

*Primary Examiner* — Thien M Le
(74) *Attorney, Agent, or Firm* — Stoel Rives LLP

(57) ABSTRACT

A finger wearable scanner includes a scanner unit detachably coupled to a trigger unit. The scanner unit includes an upper enclosure and a lower enclosure that are detachable from each other, and a scan engine mount assembly and a scan engine mounted thereto that is configured to read and decode an identifier on an object. The scan engine assembly includes mounting locations that engage with fasteners to mount be mounted to both the upper enclosure and the lower enclosure. The trigger assembly is configured to be attached to and detached from the wearable scanner, and to be worn by a body part of a user. The trigger assembly includes a trigger switch to control operational functions of the wearable scanner responsive to an input from the user.

20 Claims, 26 Drawing Sheets

(56) References Cited

U.S. PATENT DOCUMENTS

| | | | |
|---|---|---|---|
| 10,135,213 B2 | 11/2018 | Brunnbauer et al. | |
| 10,466,782 B2 | 11/2019 | Brunnbauer et al. | |
| 10,537,143 B2 | 1/2020 | Guenther et al. | |
| 2011/0175705 A1* | 7/2011 | Bellows | H04B 17/103 |
| | | | 340/10.1 |
| 2014/0249944 A1* | 9/2014 | Hicks | G06Q 30/0281 |
| | | | 705/17 |
| 2015/0278570 A1* | 10/2015 | Van Horn | H01Q 1/52 |
| | | | 235/472.01 |
| 2016/0161301 A1* | 6/2016 | Guenther | A61B 5/6806 |
| | | | 702/150 |
| 2018/0146720 A1 | 5/2018 | Sittig et al. | |
| 2019/0196535 A1 | 6/2019 | Paufler | |
| 2019/0197273 A1 | 6/2019 | Mazzone | |
| 2019/0364996 A1* | 12/2019 | Kettner | A41D 19/0024 |

* cited by examiner

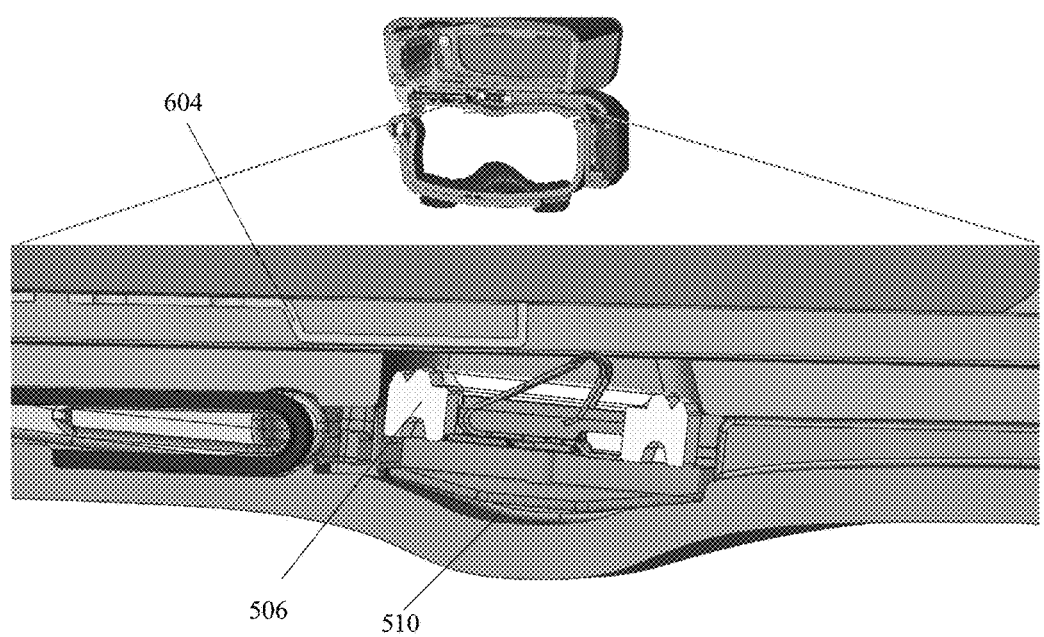
FIG. 7G
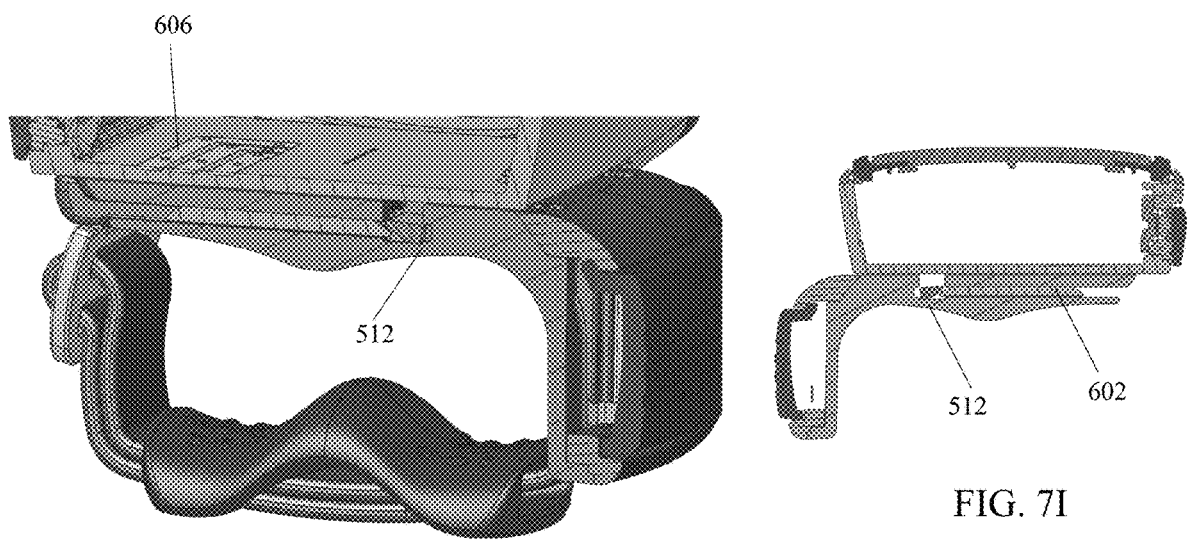
FIG. 7H
FIG. 7I

FINGER WEARABLE SCANNER AND RELATED METHODS

CROSS REFERENCE TO RELATED APPLICATION

This application claims the benefit of U.S. Provisional Application No. 62/810,899, filed Feb. 26, 2019, and entitled "Finger Wearable Scanner and Related Methods," the disclosure of which is hereby incorporated in its entirety by this reference.

TECHNICAL FIELD

The disclosure relates generally to the field of data readers, such as barcode readers. More specifically, the disclosure relates to wearable data readers.

BACKGROUND

Data readers (e.g., barcode readers) are used in a variety of ways to recognize one or more identifiers (e.g., a one-dimensional barcode, two-dimensional barcode, text, images, packaging, watermark, etc.) associated with an object. Barcode readers are physically configured for different uses. For example, checkout counters at points-of-sale have barcode readers that are configured to be used to scan barcodes on consumer goods, and are often fixed position and/or are handheld. For performing order picking, barcode scanners have historically been handheld in the shape of a gun with a handgrip and trigger for activating the scanner. More recently, barcode scanners have been wearable by a user to ease order picking processes, such as performing order picking in warehouses or retail stores, for example. However, conventional wearable barcode readers are bulky as the readers tend to be inches thick, which often results in the readers getting caught on edges of boxes, shelves, or otherwise. As a result of the thickness and configuration of wearable barcode scanners, the scanners result in a physical hassle to the user, which ultimately results in inefficiency of productivity. Additionally, the weight and cabling of conventional wearable barcode readers are prohibitively cumbersome to the user. As a result of the physical configurations of conventional wearable barcode readers, users tend to refrain from using the barcode readers for extended periods of time due to physical challenges and inefficiencies resulting therefrom.

BRIEF SUMMARY

Embodiments of the disclosure include a scanner unit and a trigger assembly. The scanner unit includes an upper enclosure and a lower enclosure that are detachable from each other; and a scan engine mount assembly and a scan engine mounted thereto that is configured to read and decode an identifier on an object, wherein the scan engine assembly includes mounting locations that engage with fasteners to mount be mounted to both the upper enclosure and the lower enclosure. The trigger assembly is configured to be attached to and detached from the wearable scanner, and to be worn by a body part of a user. The trigger assembly includes a trigger switch to control operational functions of the wearable scanner responsive to an input from the user.

DETAILED DESCRIPTION

Figure 1A:
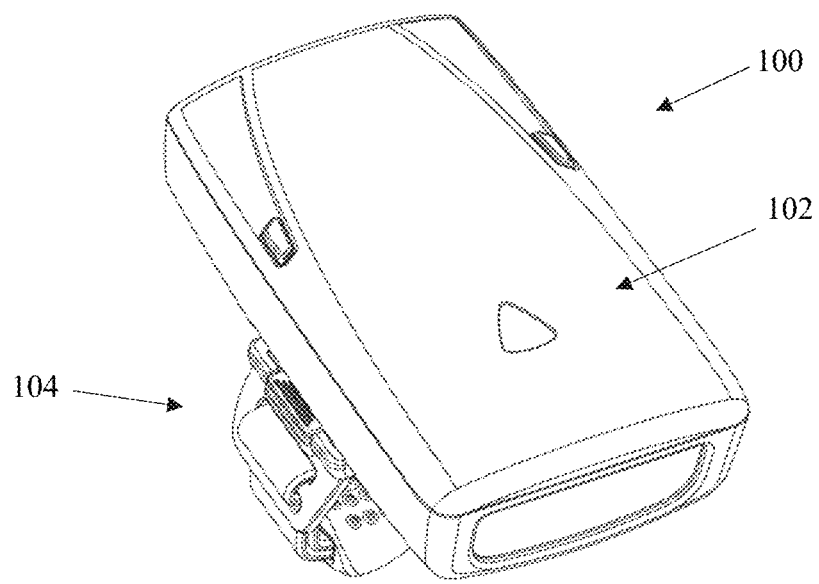
FIGS. 1A-1G are various views of a wearable scanner according to an embodiment of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, and arrangement of one or more of at least one structure and at least one apparatus facilitating operation of one or more of the structure and the apparatus in a pre-determined way.

As used herein, the phrases "coupled to" or "coupled with" refer to structures operatively connected with each other, such as connected through a direct connection or through an indirect connection (e.g., via another structure).

Figure 1B:
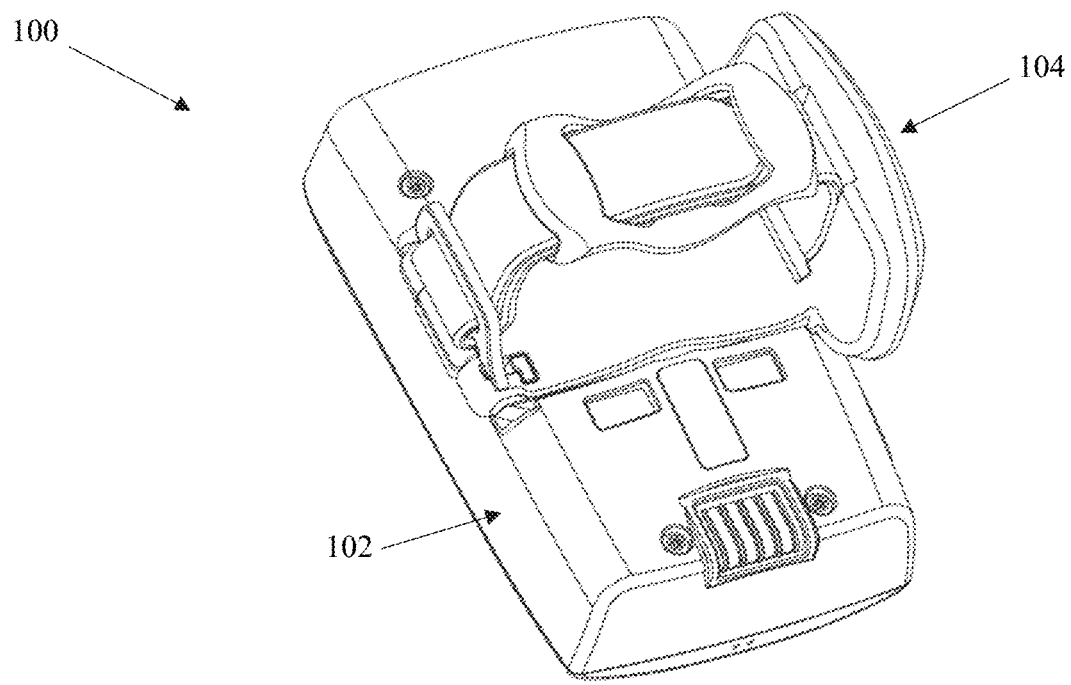
Figure 1C:
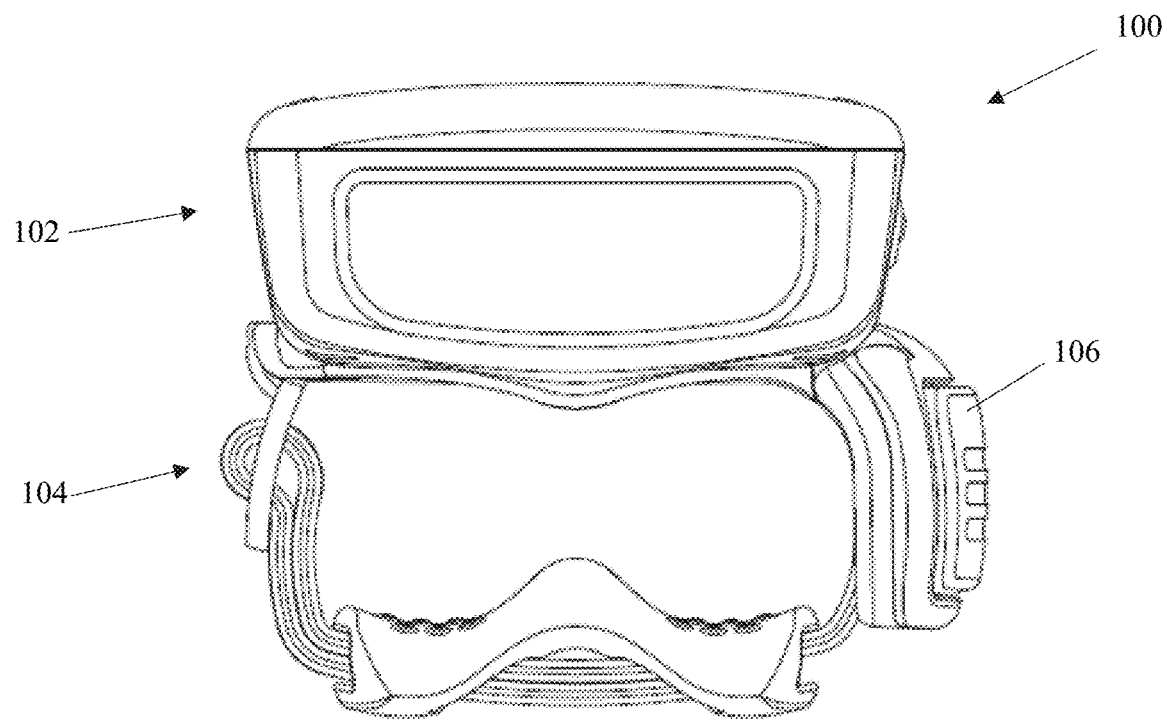
Figure 1D:
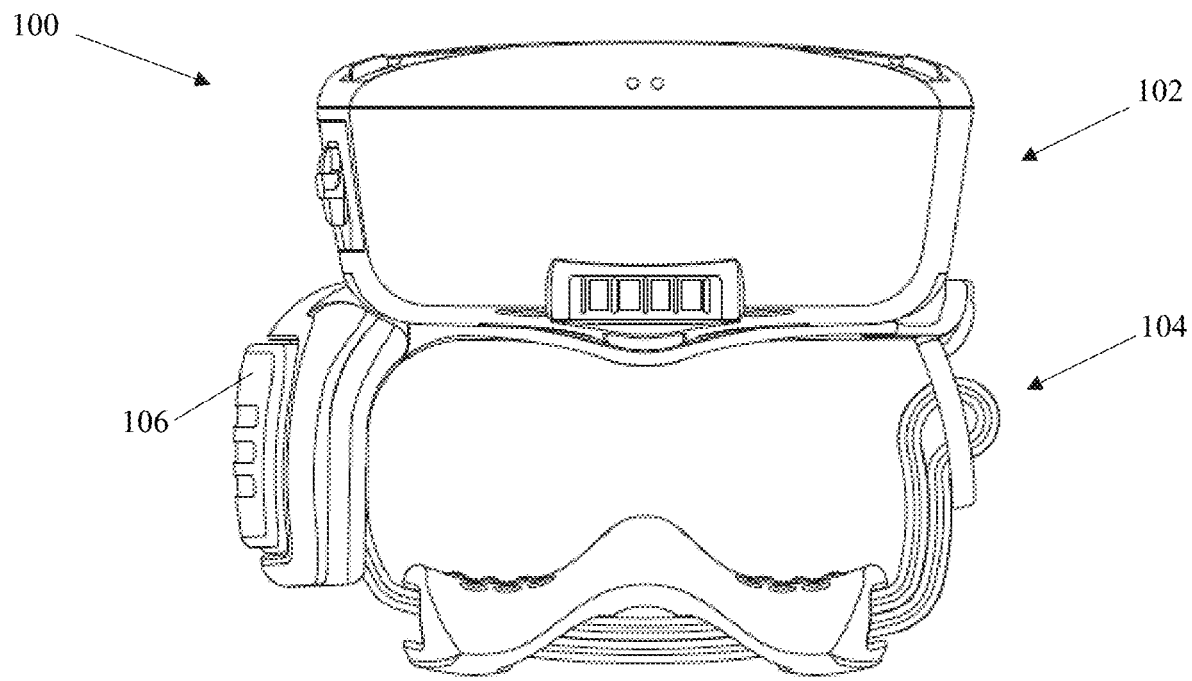
Figure 1E:
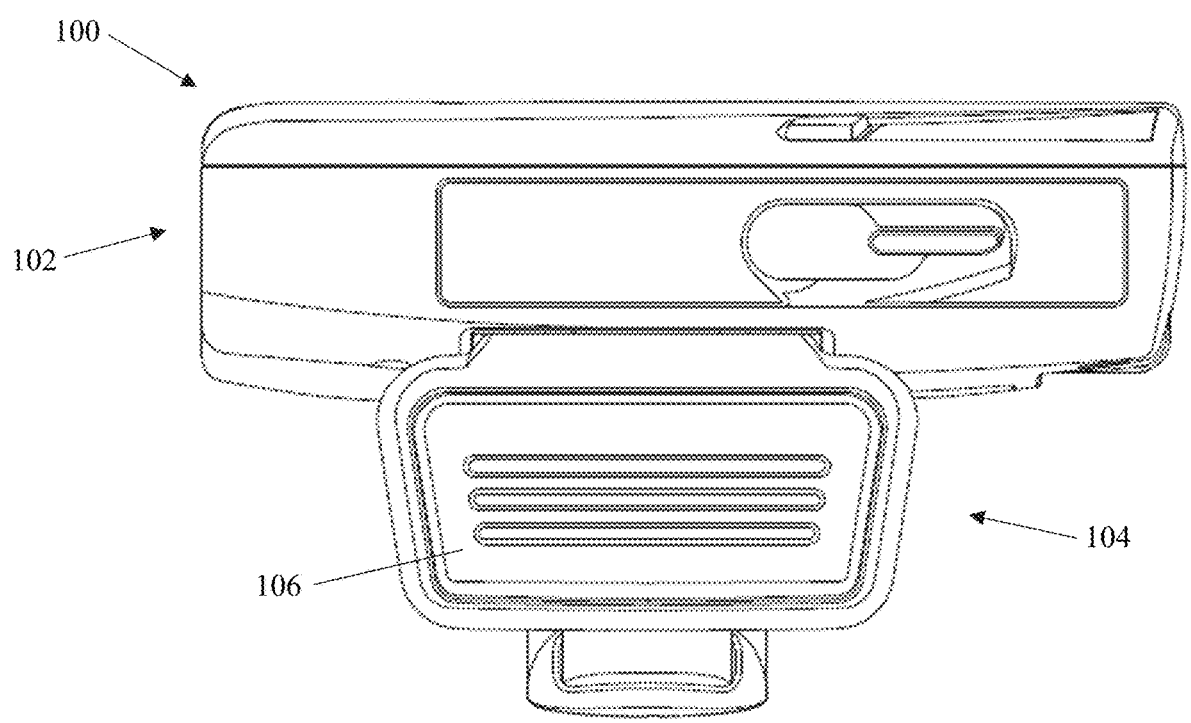
Figure 1F:
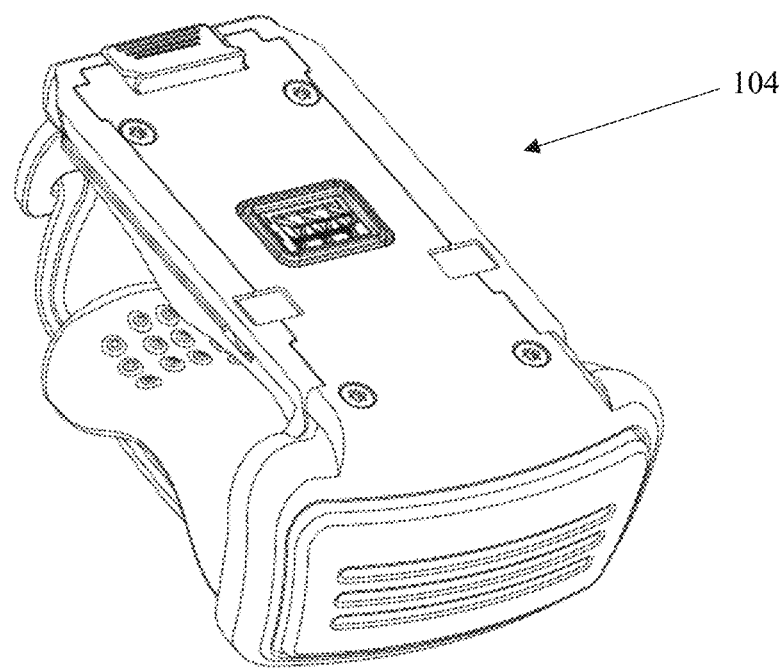
Figure 1G:
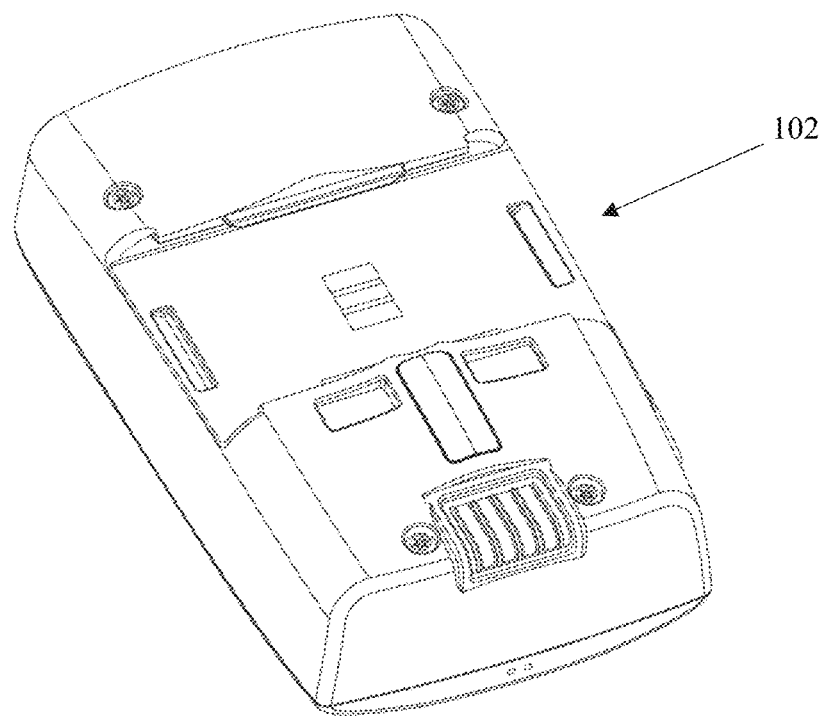

FIGS. 1A-1G are various views of a wearable scanner 100 having a scanner unit 102 operably coupled with a trigger assembly 104 according to an embodiment of the disclosure. In particular, FIG. 1A is a top perspective view of the wearable scanner, FIG. 1B is a bottom perspective view of the wearable scanner 100, FIG. 1C is a front view of the wearable scanner 100, FIG. 1D is a back view of the wearable scanner 100, and FIG. 1E is a side view of the wearable scanner 100. FIG. 1F is a perspective view of the trigger assembly 104 with the scanner unit 102 detached. FIG. 1G is a perspective view of the scanner unit 102 with the trigger assembly 104 detached.

The wearable scanner 100 includes a scanner unit 102 operably coupled with a trigger assembly 104. The scanner unit 102 may include one or more scanning elements such a scan engine including one or more imagers, light sources, processors, memory, and other components configured to read and decode an identifier (e.g., 1D codes, 2D codes, watermarks, packaging, text, etc.) according to various symbologies and image recognition techniques. The trigger assembly 104 may include a strap and other ergonomic features configured to attach the wearable scanner 100 to a body part of a user (e.g., one or more fingers) such that the scanner unit 102 may rest on the top of the fingers and enable the user to activate a trigger switch 106 (e.g., via a thumb) on the side of the trigger assembly 104 to control operational functions of the wearable scanner 100. The trigger assembly 104 may be configured to attach to the underside of the scanner unit 102 to establish the appropriate electrical connections therebetween and provide a support for the scanner unit 102 when worn by the user. The scanner unit 102 and the trigger assembly 104 may be detached from each other as shown particularly in FIGS. 1F and 1G. As shown, the underside of the scanner unit 102 may include a recessed portion (e.g., in the central region) that slides across a protruding portion on the top side trigger assembly 104 to mate with grooves or other connecting regions that secure the scanner unit 102 to the trigger assembly 104. Electrical contacts (e.g., connector spring contact 604 described further below) may be located within the recessed portion of the scanner unit 102 to align with corresponding contacts (e.g., connector springs 504 described further below) located in the trigger assembly 104 to provide power and/or communication therebetween when attached. The recessed portion of the scanner unit 102 may also include cavities (e.g., depressions, slots, etc.) that engage with the spring latch (see element 402 in FIGS. 4A-4H) to provide a locking key that secures the scanner unit 102 with the trigger assembly 104 to avoid being accidently removed. Each end of the recessed portion may include such a cavity, which may enable the scanner unit to be flipped and slid across the by sliding across the face thereof until engaging with the locking key, in which the spring latch 402 may engage with a corresponding cavity at an end of the recessed portion of the scanner assembly 102 (see FIG. 1G). Thus, the scanner unit 102 may be attachable with the trigger assembly 104 in either a right-hand or a left-hand configuration.

Figure 2A:
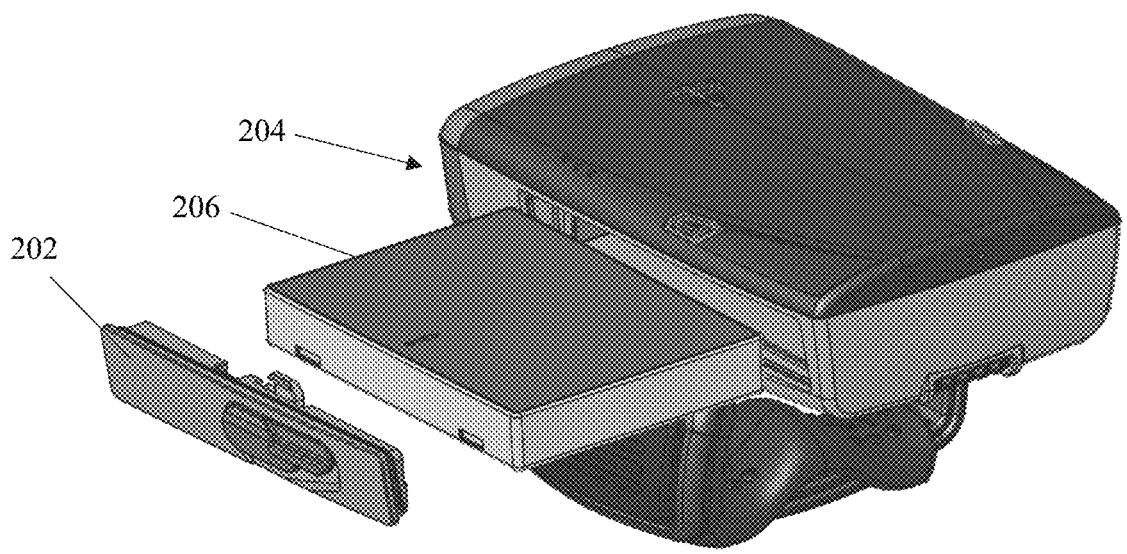
FIGS. 2A and 2B are various side views of the wearable scanner.
Figure 2B:
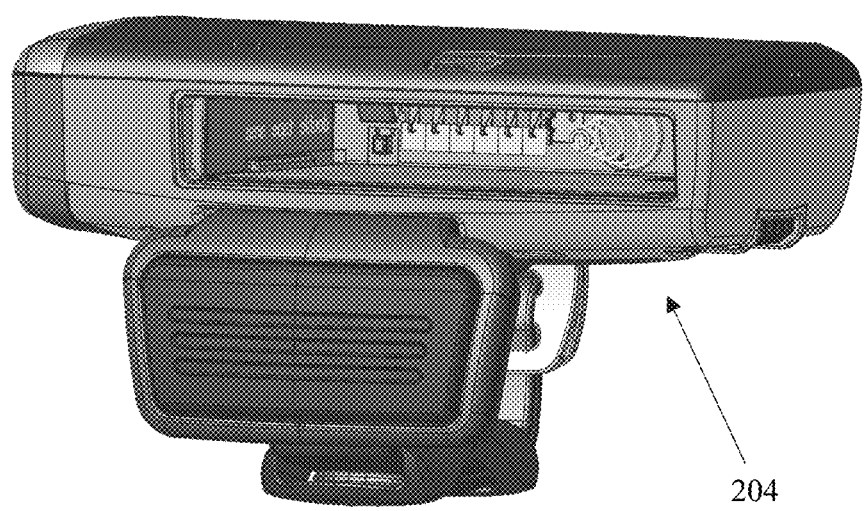

FIGS. 2A and 2B are various side views of the wearable scanner 100 showing placement of a power source, such as battery pack 206 which may be inserted into a slot 204 within the housing of the scanner unit 102 from the side. The slot 204 may be accessed by removing a battery latch 202 from the side of the scanner unit 102 to expose the internal slot 204 and connectors for the battery pack 206 to provide power to the scanner unit 102. The battery pack 206 is inserted into the slot 204 and the battery pack 206 is held in position by the latch 202. The battery pack 206 may be at least partially ejected by internal helical spring when the latch 202 is released.

As a result, the battery pack 206 may be located internal to the body of the scanner unit 102 and not mounted on an external side thereof. Doing so may enable the battery pack 206 to be removed and replaced easily while also keeping the overall size and weight of the wearable scanner 100 at a low level. The location of the battery pack 206 may be approximately the center of gravity for the wearable scanner 100 and close to the user's fingers. Gyro effect forces on the hand motion may be reduced by having the scanner center of gravity localized in the middle of the scanner 100 and closer to the hand fingers when the battery pack 206 is placed internally and centered.

Because the wearable scanner 100 may be mounted on the user's fingers for an extended time, the wearable scanner 100 may desirably be small and light weight to increase operator comfort during usage. The placement of the battery pack and the connections to the enclosure enable the heaviest component (i.e., the battery) to be located close to the fingers and centered in the enclosure volume.

Figure 3A:
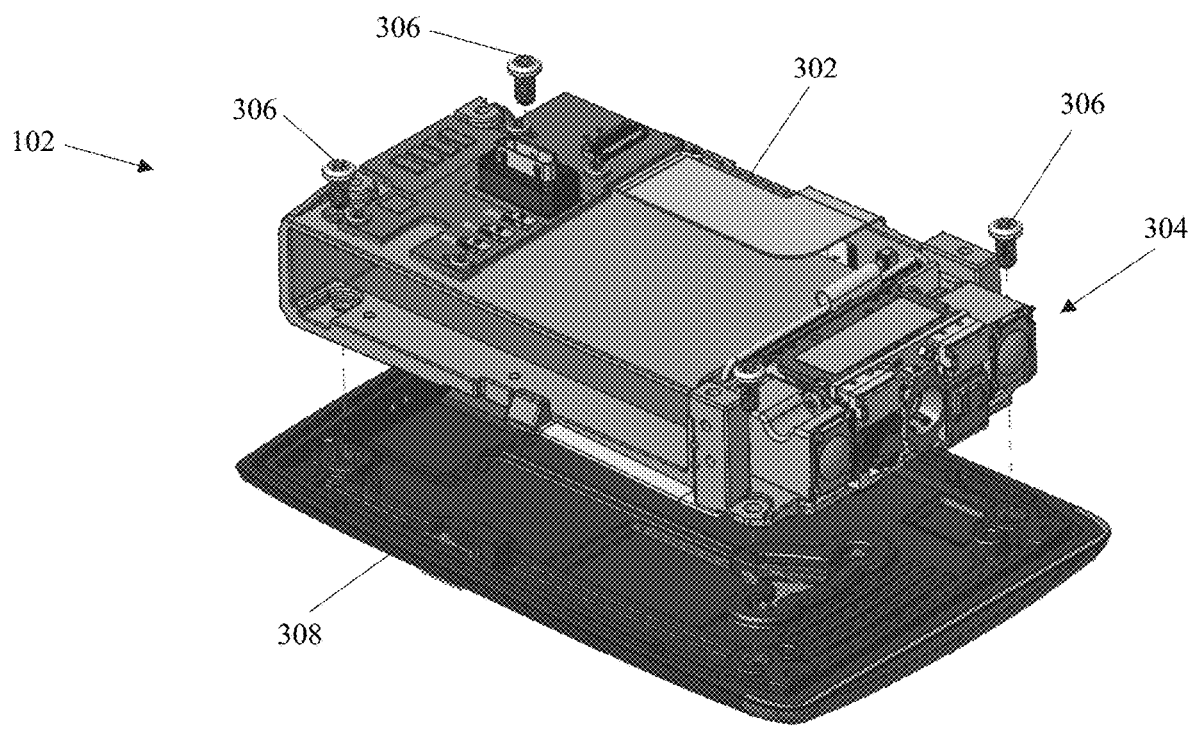
FIGS. 3A-3E are various views of the internal connections of the components of the scanner unit with respect to its enclosures.
Figure 3B:
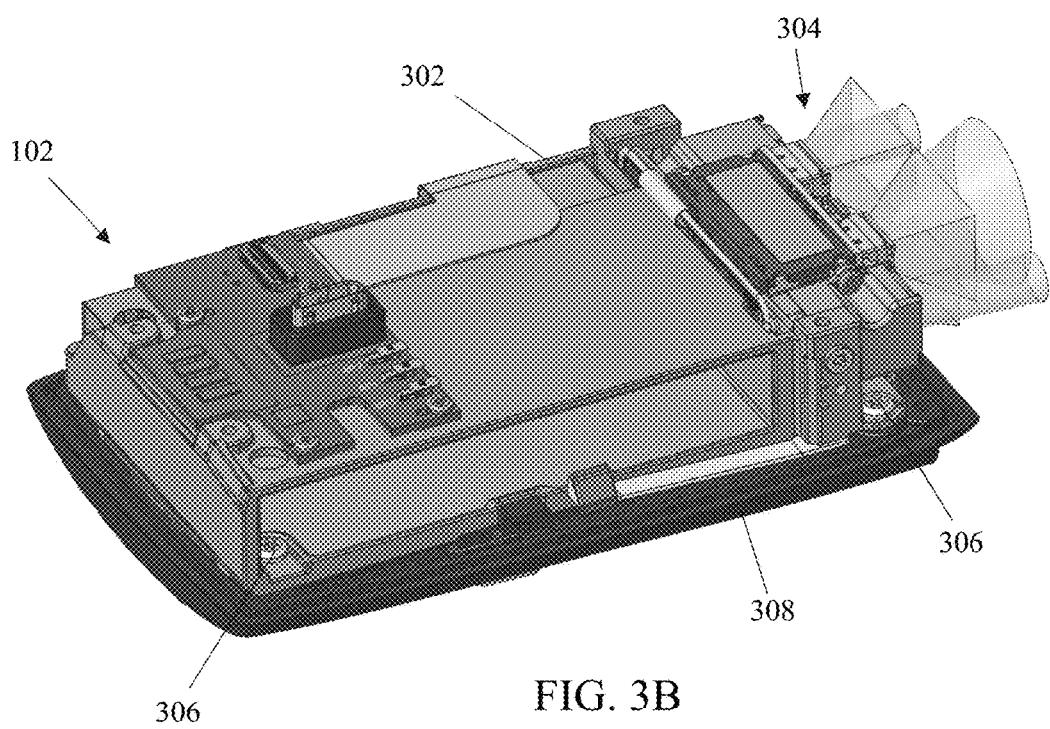
Figure 3C:
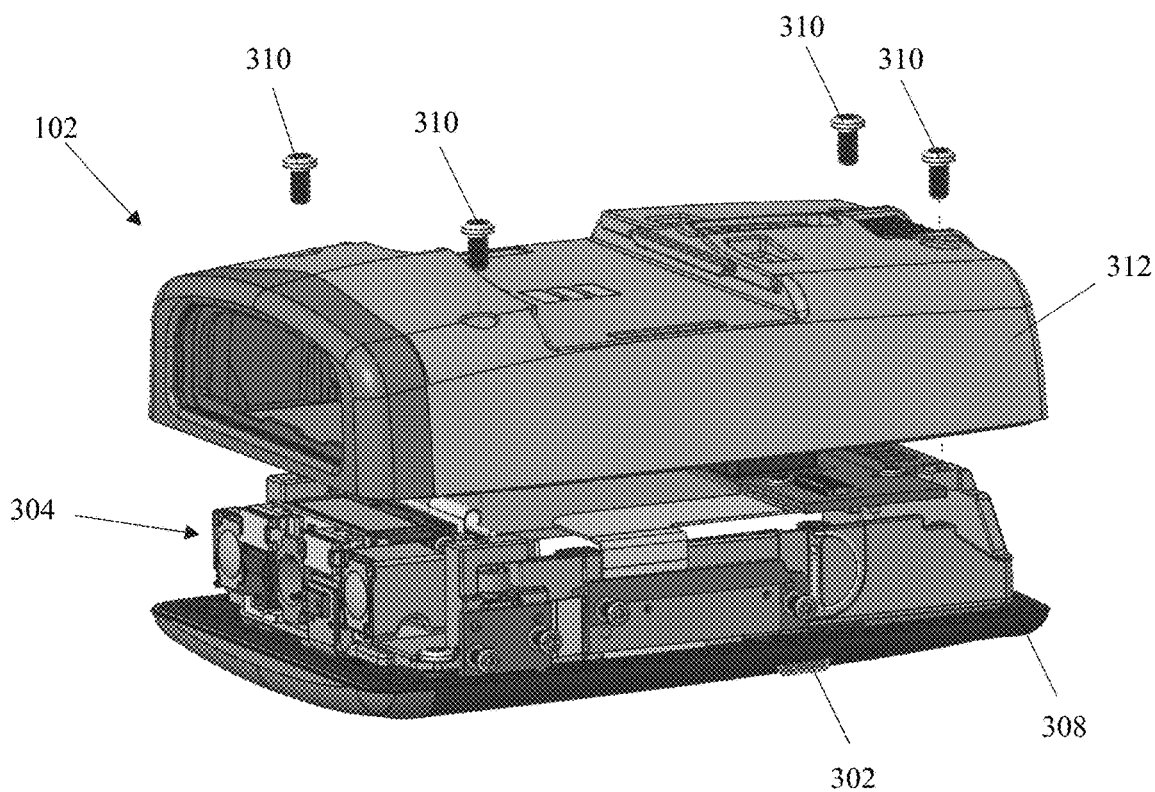
Figure 3D:
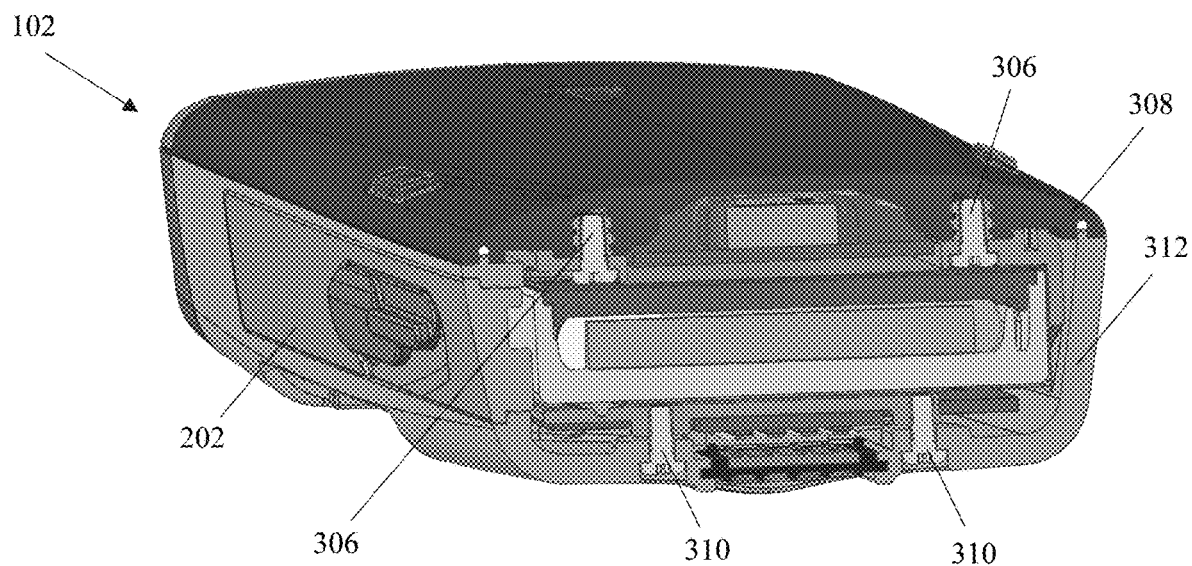
Figure 3E:
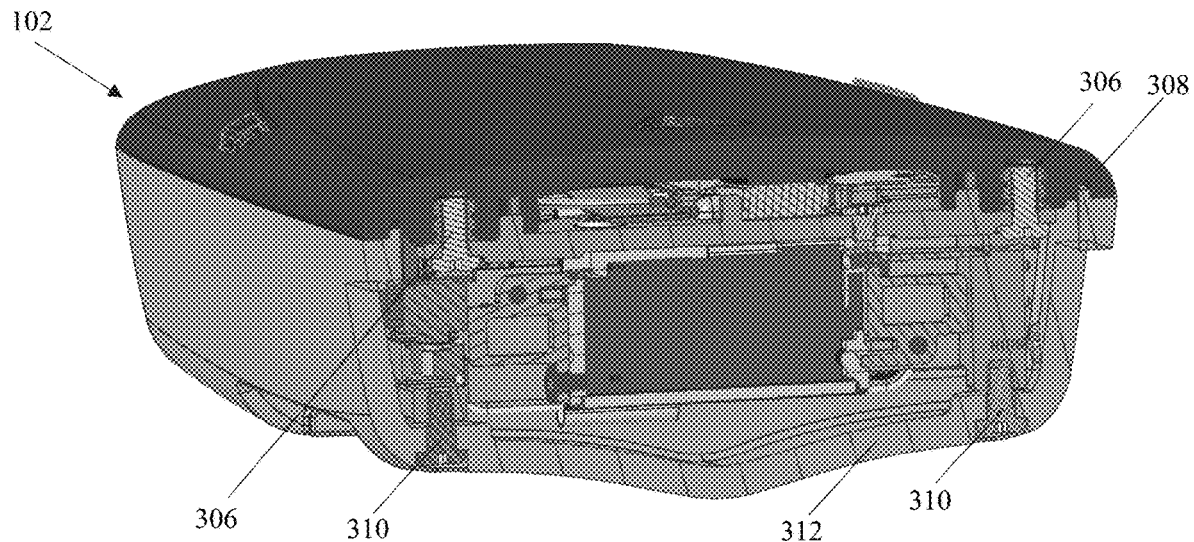

FIGS. 3A-3E are various views of the internal connections of the components of the scanner unit 102 with respect to its enclosures. The scanner unit 102 includes an upper enclosure 308 and a bottom enclosure 312 that may be detached from each other, and which house a scan engine mount assembly 302 (that includes the slot and connections for the battery pack and the scan engine 304). As shown in FIGS. 3A-3B, fasteners 306 (e.g., screws) may be used to mount the scan engine mount assembly 302 to the upper enclosure 308 of the housing of the scanner unit 102. FIGS. 3C-3E show fasteners 310 (e.g., screws) used to mount the scan engine mount assembly 302 to the bottom enclosure 312 of the housing of the scanner unit 102. Thus, the scan engine mount assembly 302 may have mounting locations engage with the fasteners 306, 310 to be attached directly with each of the upper disclosure 308 and the bottom enclosure 312.

Thus, embodiments include the upper enclosure 308 and the bottom enclosure 312 fastened together using the scanning engine mount assembly 302 as the internal mount providing the link therebetween and connecting the two enclosures 308, 312 together. Internal components are present between the upper enclosure 308 and the lower enclosure 312 for direct connection. In some embodiments using screws, the upper enclosure 308 has threaded inserts to fasten the scan engine mount assembly 302 to it by screws 306. The scan engine mount assembly 302 has threaded inserts for fastening the bottom enclosure 312 by screws 310. The assembly of the upper enclosure and scan engine is mounted to the bottom enclosure. The bottom enclosure is fastened to the scan engine threaded holes by screws.

FIGS. 4A-4H are various views of the trigger assembly 104 according to an embodiment of the disclosure. The trigger assembly 104 includes a locking key including a spring latch 402 having a bottom portion 404 that engages with a strap ring 406. The strap ring 406 may engage with the strap that is used to adjust the sizing and connection to the user's fingers and the finger rest. The scanner unit 102 may attach to the trigger assembly 104 by sliding across the face thereof until engaging with the locking key, in which the spring latch 402 engage with a corresponding cavity at an end of the recessed portion of the scanner assembly 102 (see FIG. 1G). The locking key may be used for safety by preventing the scanner unit 102 from accidentally dislodging or otherwise being removed from the trigger assembly 104 when they are connected. Unlocking the scanner unit 102 may require at least two movements.

The strap ring 406 may be configured and oriented relative to the spring latch 402 to prevent the spring latch 402 from moving and unlatching from the scanner unit 102 during normal usage. The strap ring 406 rotates inward for unlatching the trigger assembly 104 when removing the scanner unit 102 from trigger assembly 104. The spring latch bottom tab 404 is used to stop (i.e., lock position) the movement of the spring latch 402 by interfering with the strap ring 406 when the strap ring 406 is rotated outward. The bottom tab 404 has no interference with the strap ring 406 is rotated inward which allows the spring latch 402 to be unlocked. The operator fingers may force the strap ring 406 to be rotated outward and preventing the spring latch 402 from unlocking during the normal operation. It will ensure the scanner unit 102 is locked during use because the fingers will provide the needed input to keep the spring latch 402 engaged in the scanner unit 102.

Figure 4A:
FIGS. 4A-4H are various views of the trigger assembly according to an embodiment of the disclosure.
Figure 4B:
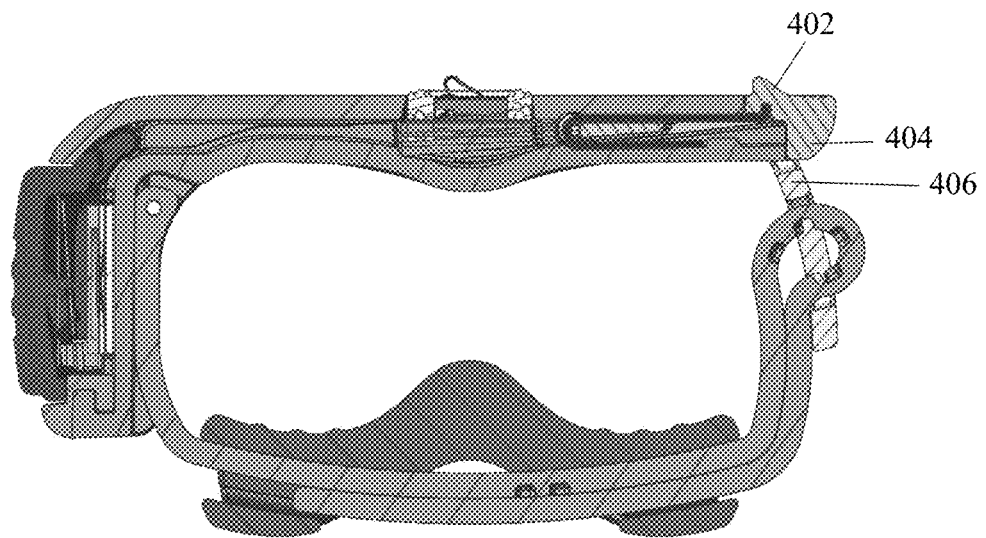
Figure 4C:
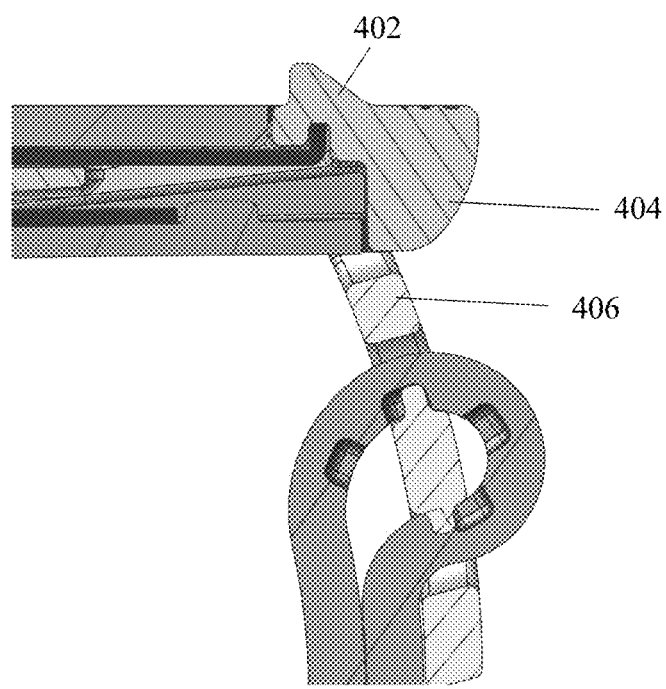
Figure 4D:
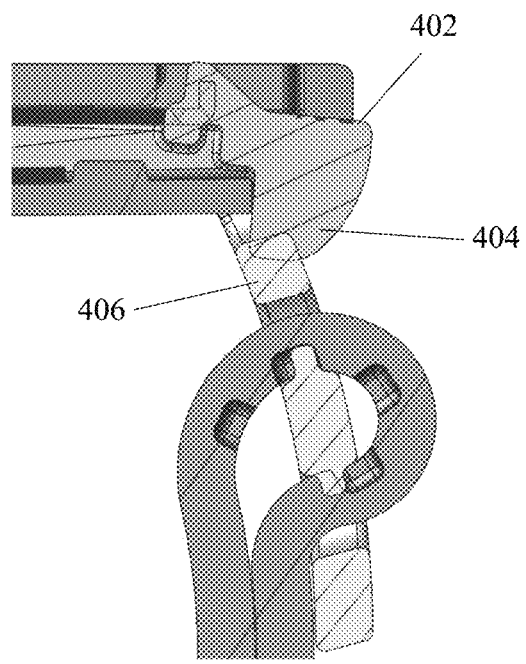
Figure 4E:
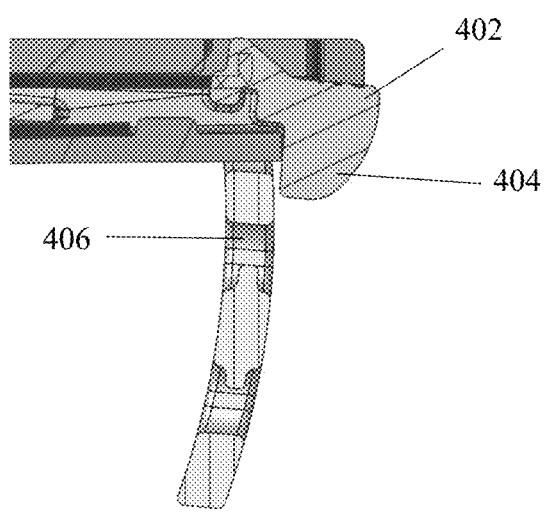
Figure 4F:
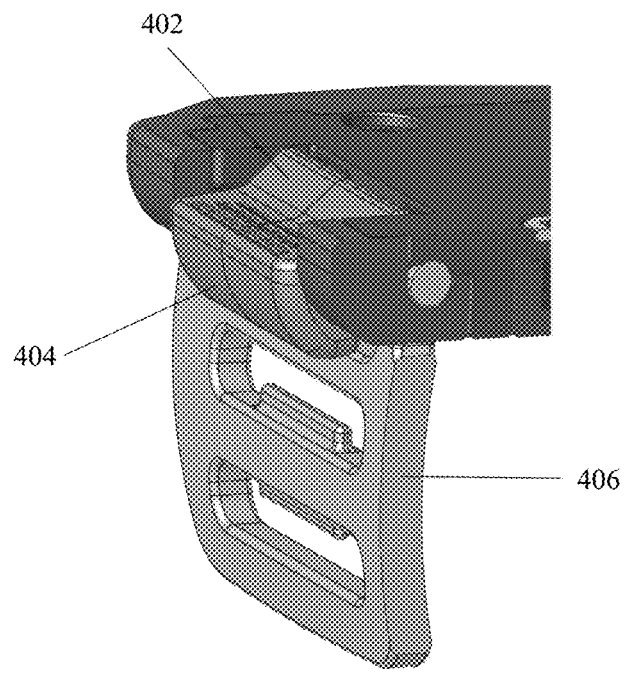
Figure 4G:
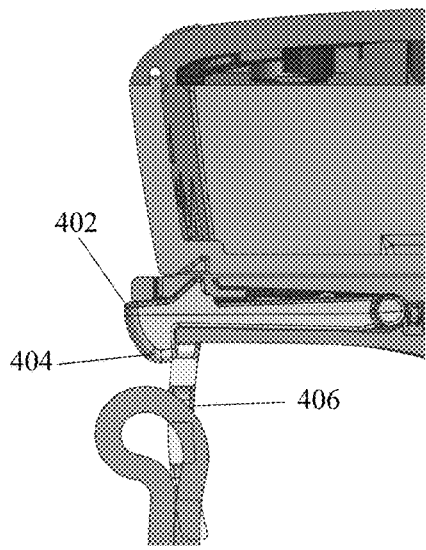
Figure 4H:
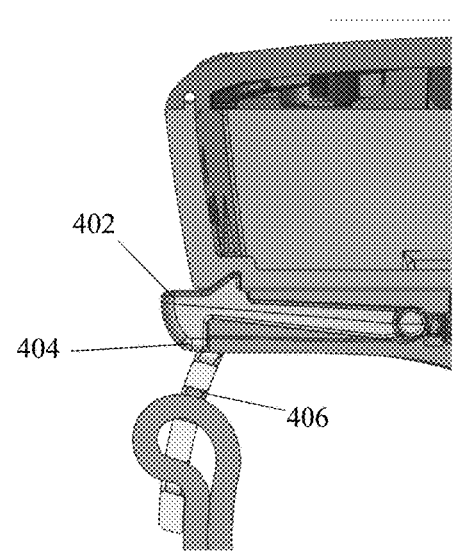

FIGS. 4C and 4D show the spring latch 402 moving from a closed to an open position. In particular, the strap ring rib acts as stop for the spring latch 402 when the spring latch 402 is pushed down for release. The strap ring 406 position is shown rotated outward. FIGS. 4E and 4F show the strap ring rib rotating to allow the spring latch 402 downward movement for unlatching the trigger assembly 102 from the scanner unit 104. The strap ring 406 position is shown rotated inward. FIG. 4G shows the spring latch 102 being open. In this case, the strap ring 406 is rotated inward to allow the spring latch 402 to move downward and unengaged the spring latch 402 with bottom enclosure. FIG. 4H shows the spring latch 402 being closed and engaged with the bottom enclosure. In this case, the strap ring 406 is pushed outward by the user fingers to prevent the spring latch 402 from moving downward.

Figure 5:
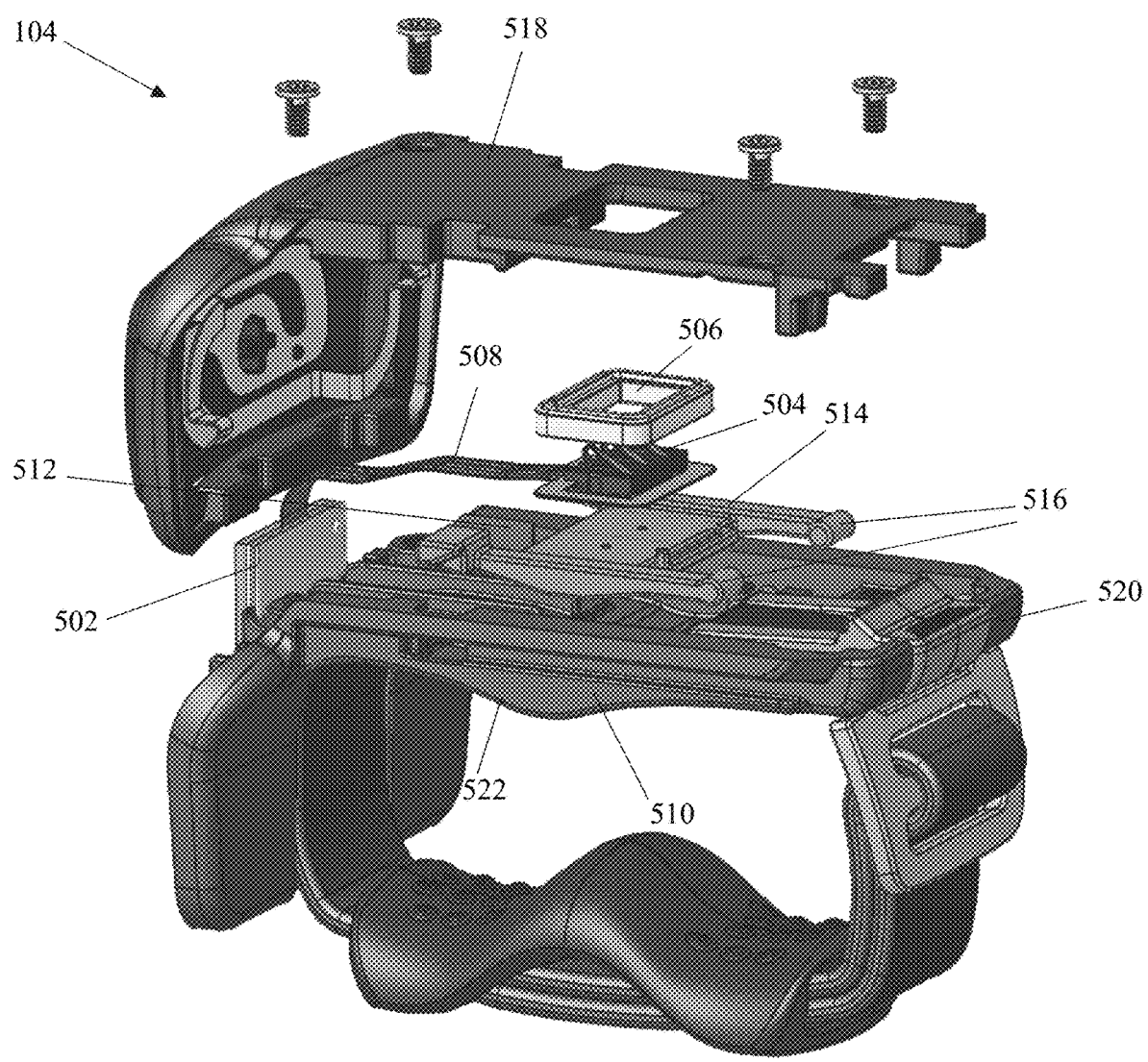
FIG. 5 is an exploded view of the trigger assembly according to an embodiment of the disclosure.
Figure 6A:
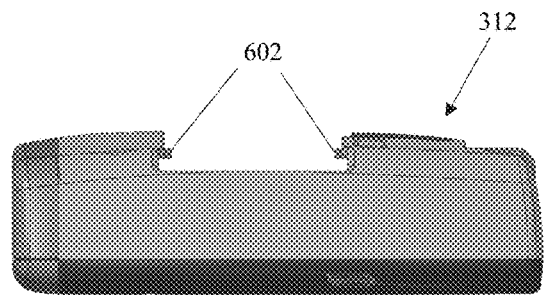
FIGS. 6A-6D are various views of the bottom enclosure of the scanner unit.
Figure 6B:
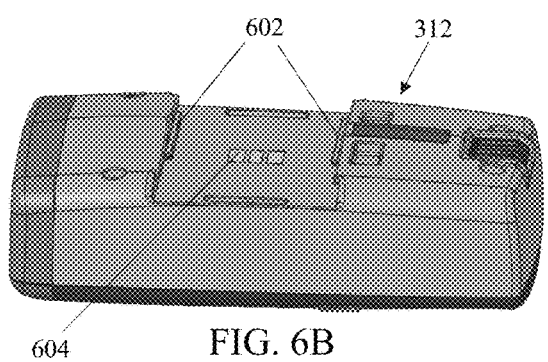
Figure 6C:
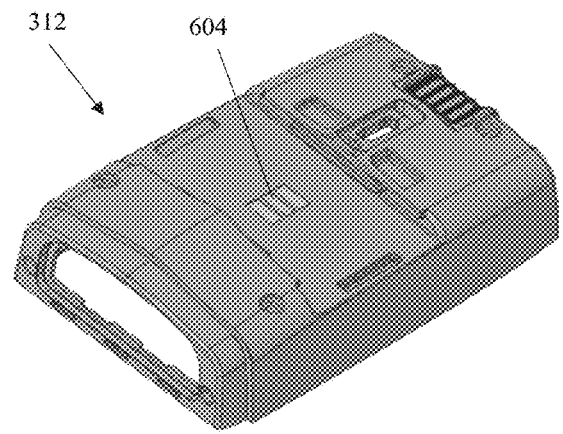
Figure 6D:
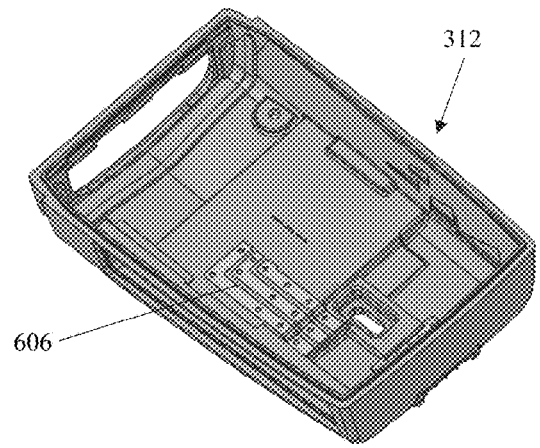

FIG. 5 is an exploded view of the trigger assembly 104 according to an embodiment of the disclosure. The trigger assembly 104 further includes a trigger switch 502 operably coupled with contact springs 504 via a connector cable 508. A rubber seal 506 may surround the contact springs 504, and which may be located on a hinge plate 510 having arms 512, an integrated spring 514, and rotational pins 516. These internal components may be housed within an upper enclosure 518 and a lower enclosure 520 also including guides 522. The upper and lower enclosures 518, 520 may be coupled together via fasteners (e.g., screws).

The wearable scanner trigger assembly 104 may have a sealed switch for IP67. The trigger assembly switch 502 may be a dome switch which is electrically activated. The electrical connection in the trigger assembly 104 may be sealed to IP67 when it is fully assembled while maintaining an overall height at a minimum. The wearable scanner with a removable trigger assembly 104 includes the trigger switch electrical connection through the flexible cable 508 where a connector spring contact 604 is mounted at the end of the flexible cable 508. The contact connector springs 594 may engage with copper surfaces on the bottom enclosure of the scanner unit 502 to complete the electrical connection to the scanner printed circuit board (PCB). The trigger electrical connections may be sealed for IP67 during operation by a rubber seal 506 that is mounted with adhesive on the flexible cable 508 and around the connector spring contact body. The rubber seal 506 and connector spring 504 are elevated vertically to create pressure for the rubber seal ribs against the bottom enclosure and for the connector springs 504 against the copper contacts when the trigger assembly 104 at the final position in the scanner bottom enclosure by the hinge plate 510. The rubber seal 506 and connector springs 504 retract downward when the trigger assembly 104 is pulled out of the scanner unit 102. The end of the flexible cable 508 has the rubber seal 506 and the connector spring 504 which they are adhered to a hinge-plate upper surface.

The hinge plate 510 allows them to move up and down when trigger assembly 104 is inserted or retracted from the scanner unit 102. The hinge plate 510 moves up or down when the hinge plate arms 512 are pushed by the bottom scanner side ribs. The hinge plate arms 512 have ramps to move them up or down when they are engaged with the bottom scanner ribs front surface. The hinge plate 510 has an integrated spring 514 to maintain the rubber seal 506 and connector pushed downward when the trigger is outside the scanner bottom enclosure for protection and to avoid the connector springs 504 from scraping on the bottom enclosure surface of the scanner unit 102 during insertion.

The flexible cable switch end and the hinge plate assembly (including the contacts spring/flexible cable/rubber seal) are placed inside the trigger assembly bottom enclosure. The flexible cable switch end may be adhered to bottom enclosure vertical surface. The other end of the flexible cable is the hinge plate 510 which hinge plate rotational pins 516 are placed in the trigger bottom enclosure as rotational half cylinders. The hinge plate pins 516 and the hinge plate 510 are captured by the upper enclosure surface of the trigger assembly. The hinge plate 510 is pushed downward by an integrated spring that pushes against the upper enclosure surface. The hinge plate has arms with ramps that are in line of the bottom enclosure side guides.

FIGS. 6A-6D are various views of the bottom enclosure 312 of the scanner unit 102. The bottom enclosure 312 includes copper contacts sheet metal 604, 606 which they are insert molded. The copper contacts 604, 606 are used to provide the electrical contacts between the main PCB and the trigger assembly contact connector. The bottom scanner enclosure has ribs 602 to guide the trigger assembly and to provide a ramp for moving the hinge plate arms (hinge plate assembly) upward.

Figure 7A:
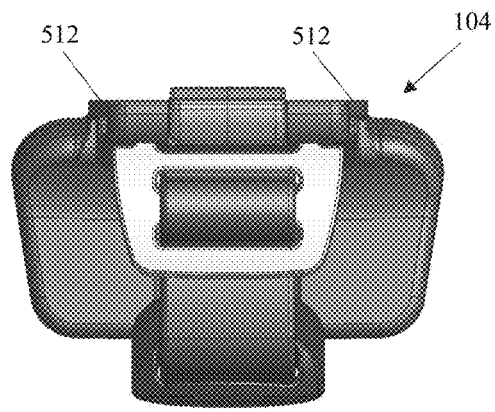
FIGS. 7A-7R are various views of the trigger assembly.
Figure 7B:
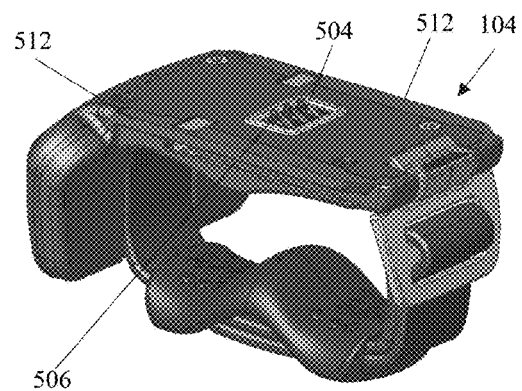
Figure 7C:
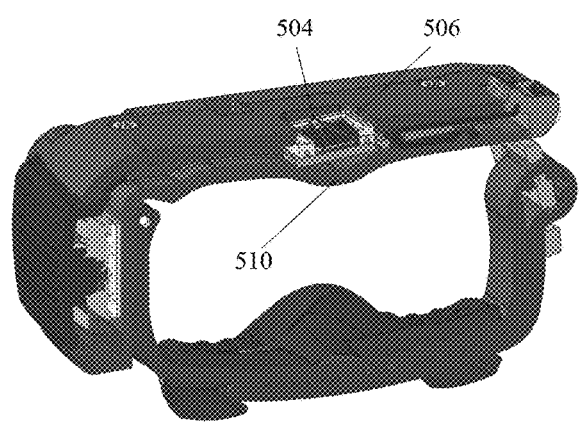
Figure 7D:
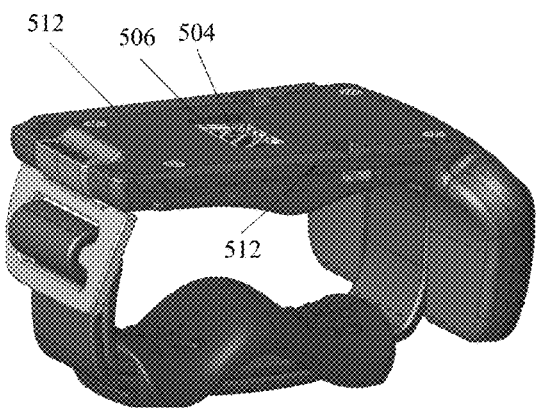
Figure 7E:
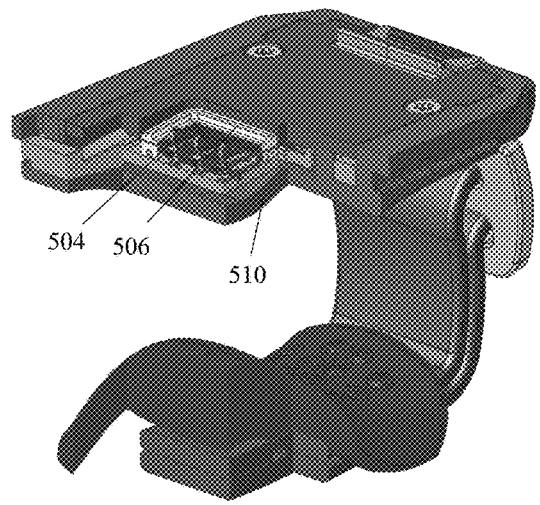
Figure 7F:
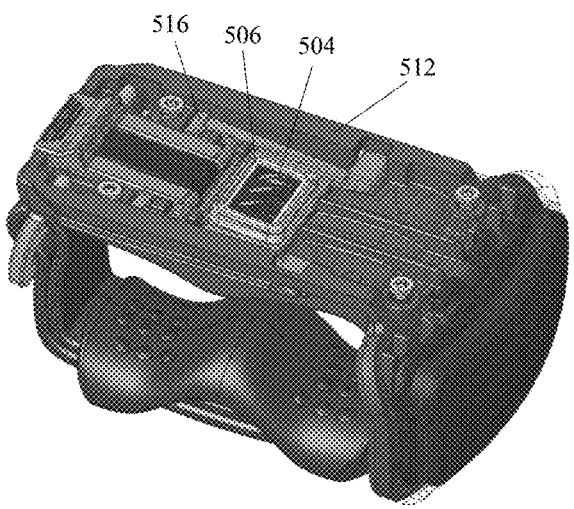
Figure 7J:
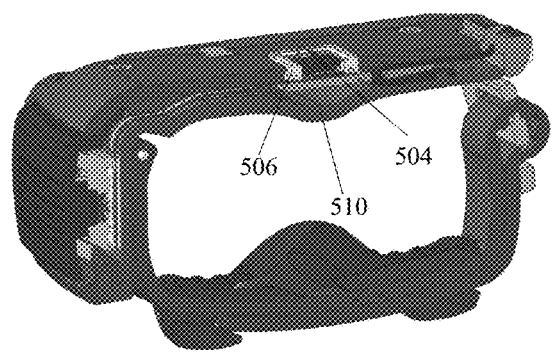
Figure 7K:
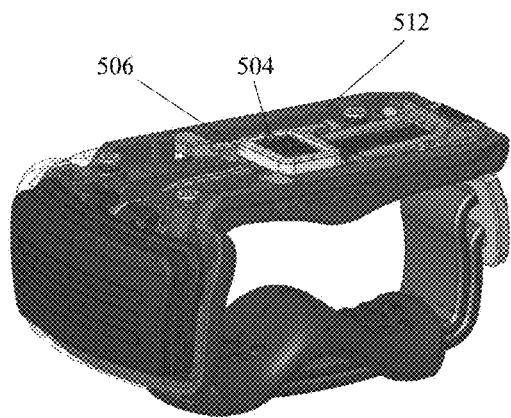
Figure 7L:
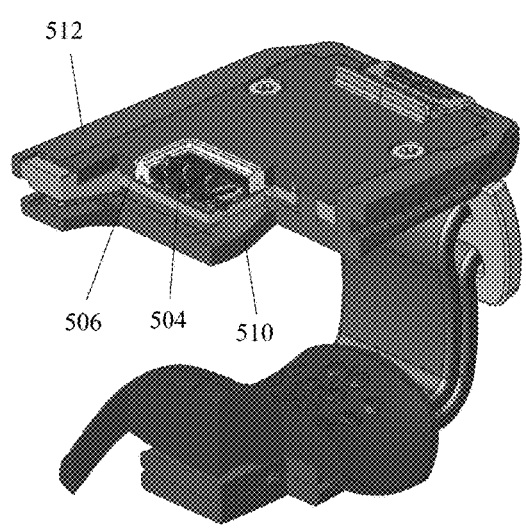
Figure 7M:
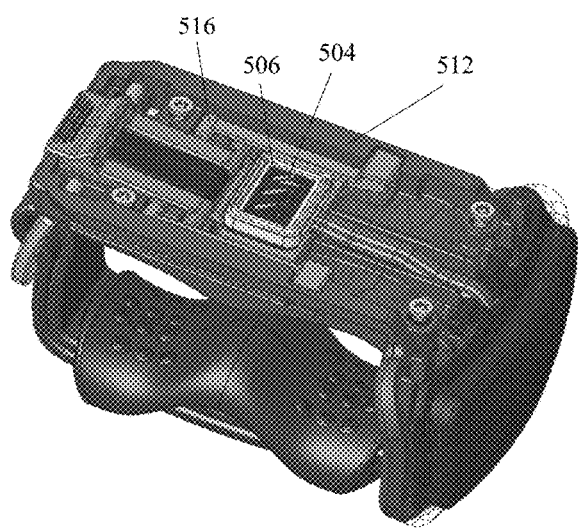
Figure 7N:
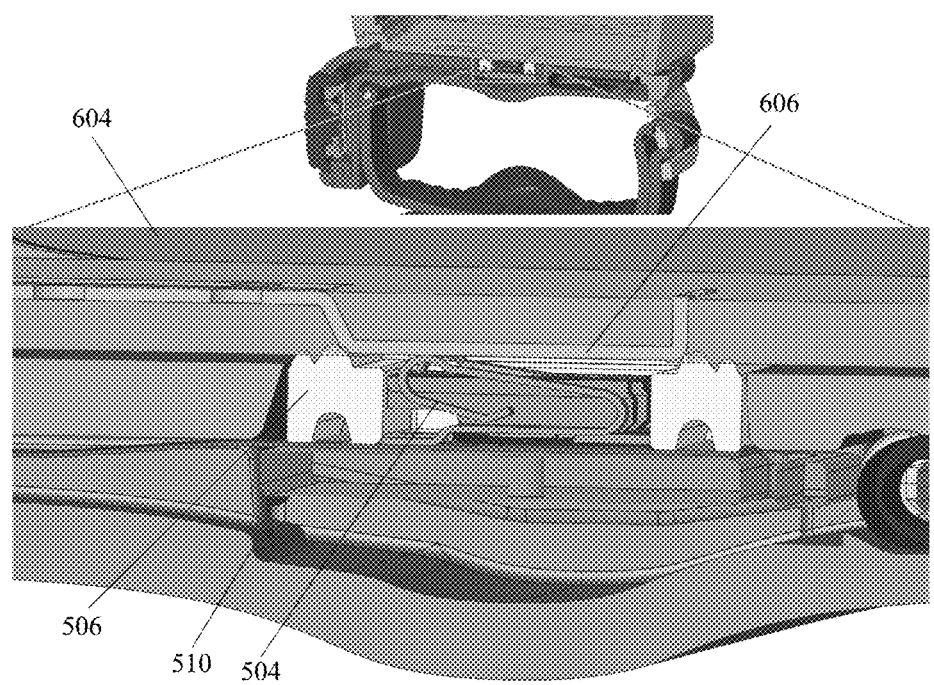
Figure 7O:
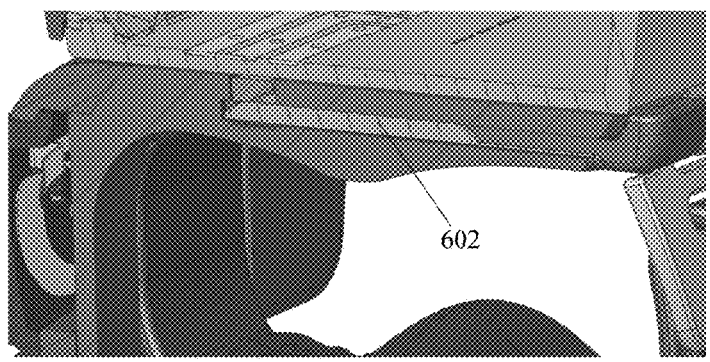
Figure 7P:
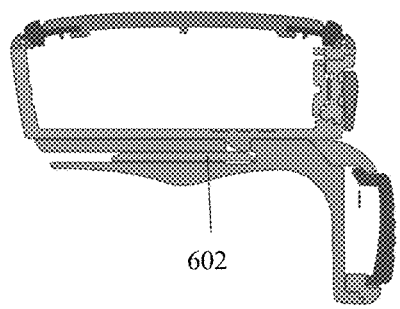
Figure 7Q:
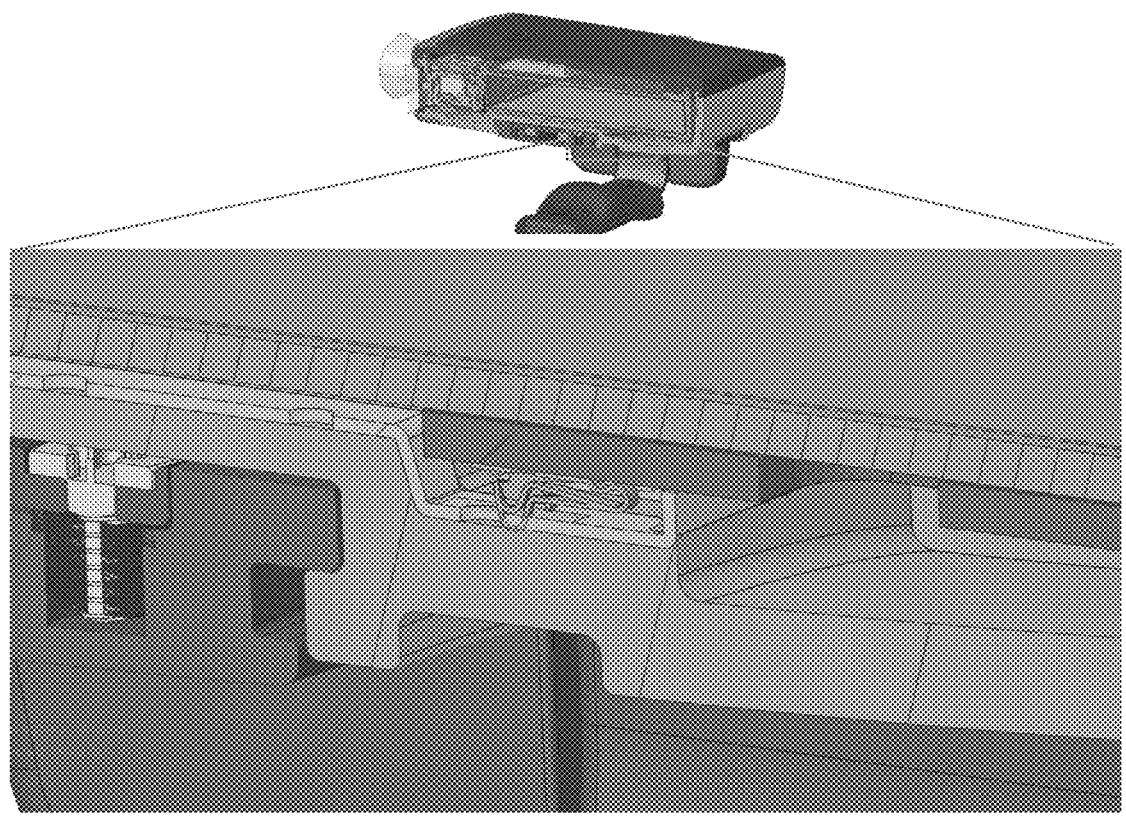
Figure 7R:
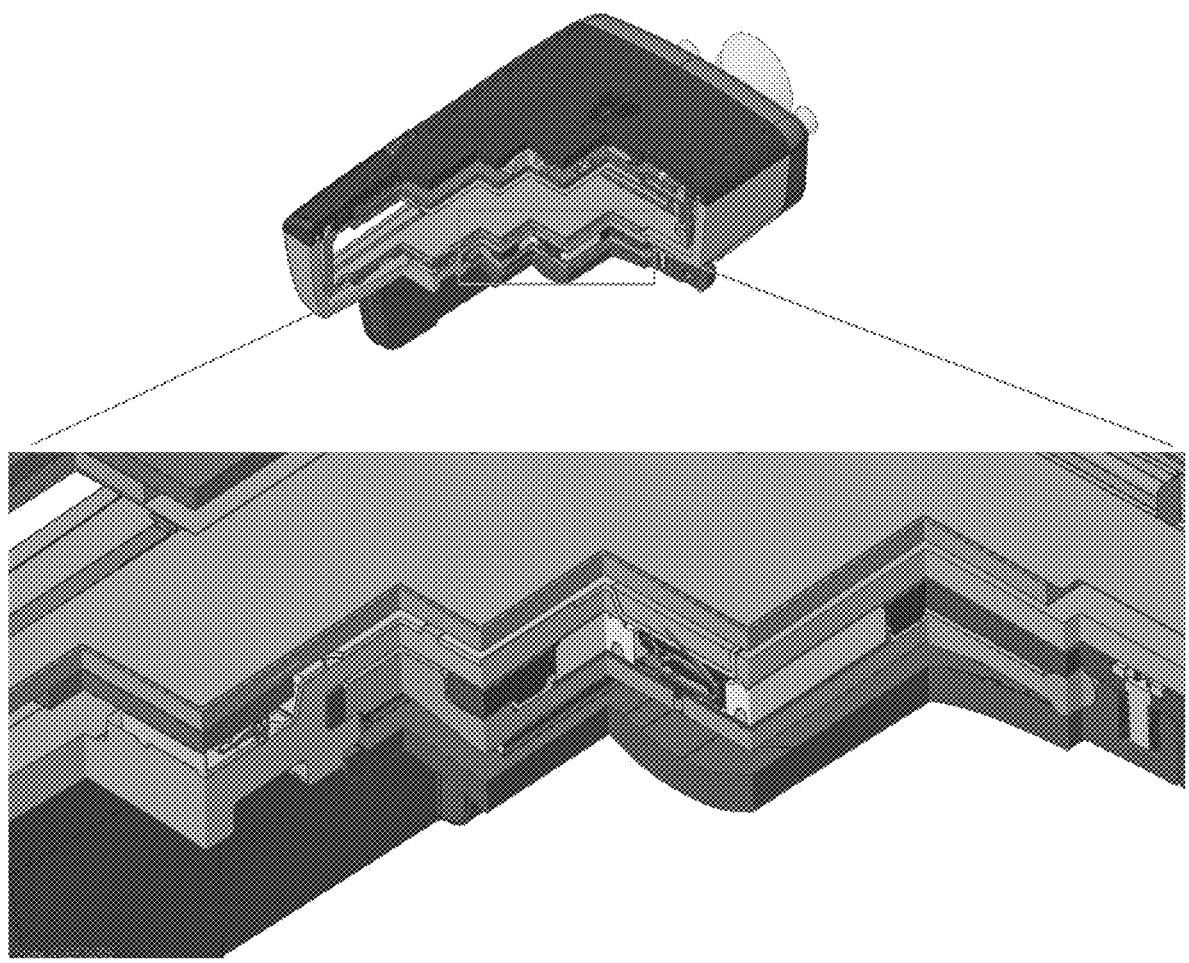

FIGS. 7A-7R are various views of the trigger assembly 104 when assembled showing placement and external exposure of the hinge plate arms 512, the contact springs 504, and rubber seal 506. In particular, FIGS. 7C-7I show the hinge plate 510 moved into a downward position relative to the enclosure surfaces such that the contact springs 504 and rubber seal 506 are also moved downward creating an open circuit and/or preparing for removal from the scanner unit 102. FIGS. 7J-7R show the hinge plate 510 moved into an upward position relative to the enclosure surfaces such that the contact springs 504 and rubber seal 506 are also moved downward creating a closed circuit after insertion of the scanner unit 102.

In some embodiments, the wearable scanner 100 may be configured such that the trigger assembly 104 and the scanner unit 102 may slide from left to right or from right to left through guides and locking mechanism to hold the scanner in place. As a result, the scanner unit 102 can be removed from the trigger assembly 104 without removing the trigger assembly from the hand. In addition, the wearable scanner 100 may enable the trigger button 106 to be functioning and accessible to the user (e.g., thumb) when the wearable scanner 100 is mounted on the left or right hand.

Figure 8A:
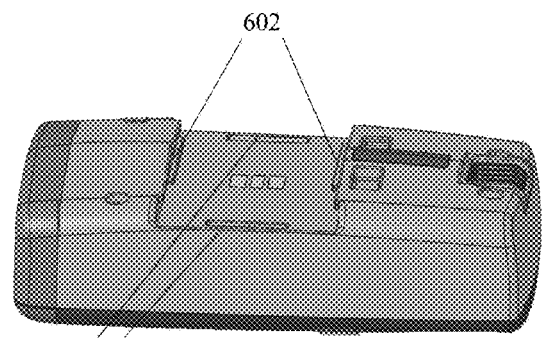
FIGS. 8A and 8B are various views of the bottom enclosure of the scanner unit.
Figure 8B:
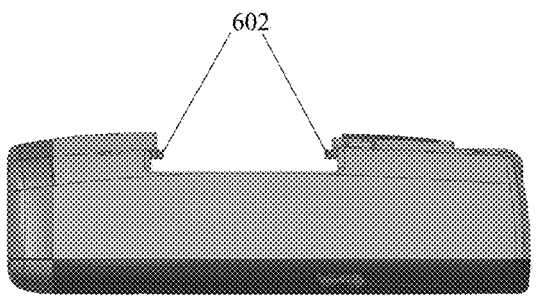
Figure 9A:
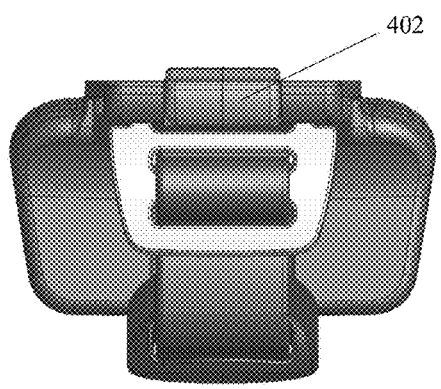
FIGS. 9A and 9B are various views of the trigger assembly.
Figure 9B:
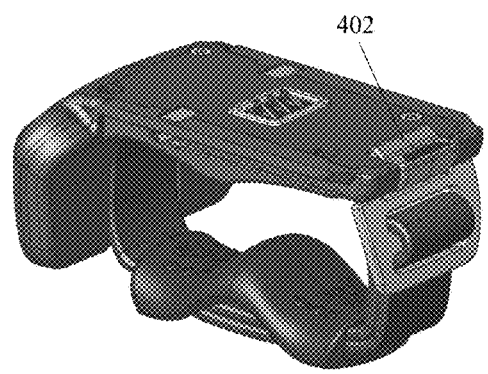
Figure 10A:
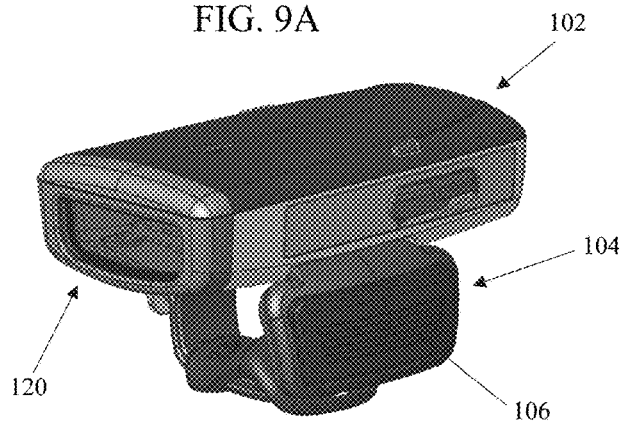
FIGS. 10A and 10B are various views of the wearable scanner.
Figure 10B:
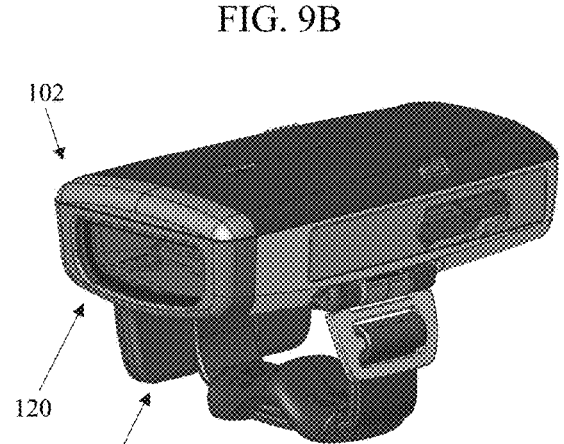

FIGS. 8A and 8B are various views of the bottom enclosure of the scanner unit 104 that will complementarily couple with the trigger assembly 104 of FIGS. 9A and 9B. The trigger assembly 104 may be removable from the scanner unit 102 to orient the trigger assembly button 106 on the left or right of the front 120 of the scanner unit 102 depending on the user preference as shown in FIGS. 10A and 10B. The scanner unit 102 may be removable from the trigger assembly 104 without removing the trigger assembly from hand which the scanner can scan bar codes without the use of trigger by using autosense functionality.

The scanner unit 102 on the bottom side has guides 602 on both sides of a recessed surface on the bottom enclosure. The trigger assembly 104 enclosure has grooves on both side for the trigger assembly to slide into the scanner guides 602. The trigger assembly 104 is placed into position by stops on the guides 602 and locked into the scanner by the spring latch 402 that can couple with recessed features 610 on either side. The trigger assembly 102 can be inserted from the left or right sides of the scanner.

Figure 11A:
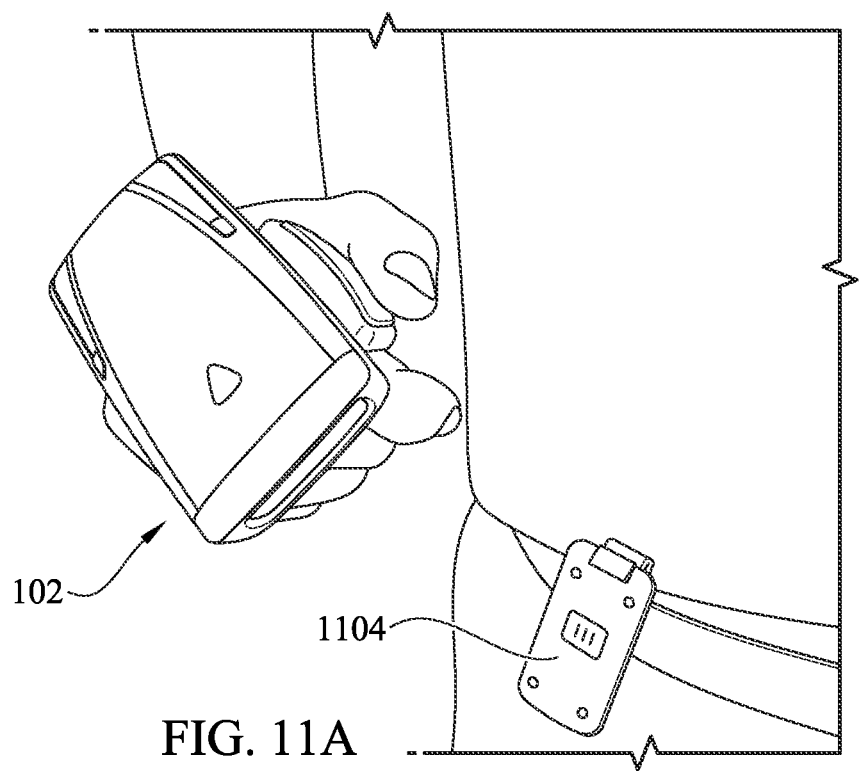
FIGS. 11A and 11B show the scanner unit 102 being removed from the trigger assembly 104 worn on the user's finger
Figure 11B:
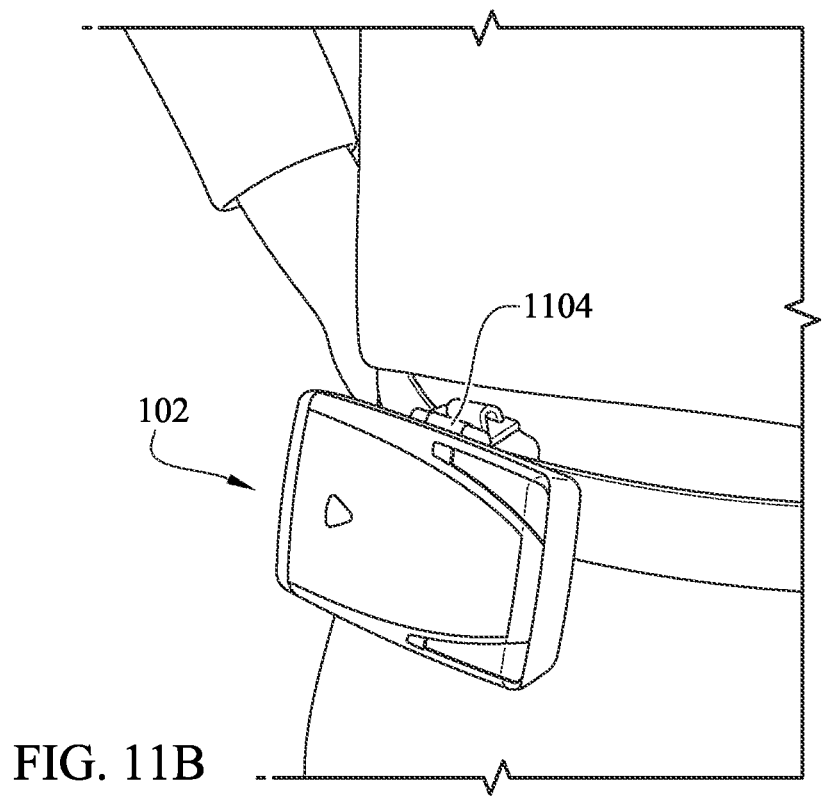

In some embodiments, the scanner unit 102 may be removed from the trigger assembly 194 while the trigger assembly 104 is mounted into the user's fingers and may be mounted on other mounts having similar mating features. For example, FIGS. 11A and 11B show the scanner unit 102 being removed from the trigger assembly 104 worn on the user's finger (FIG. 11A) and then being placed on a belt clip mount 1104 (FIG. 11B).

Figure 12A:
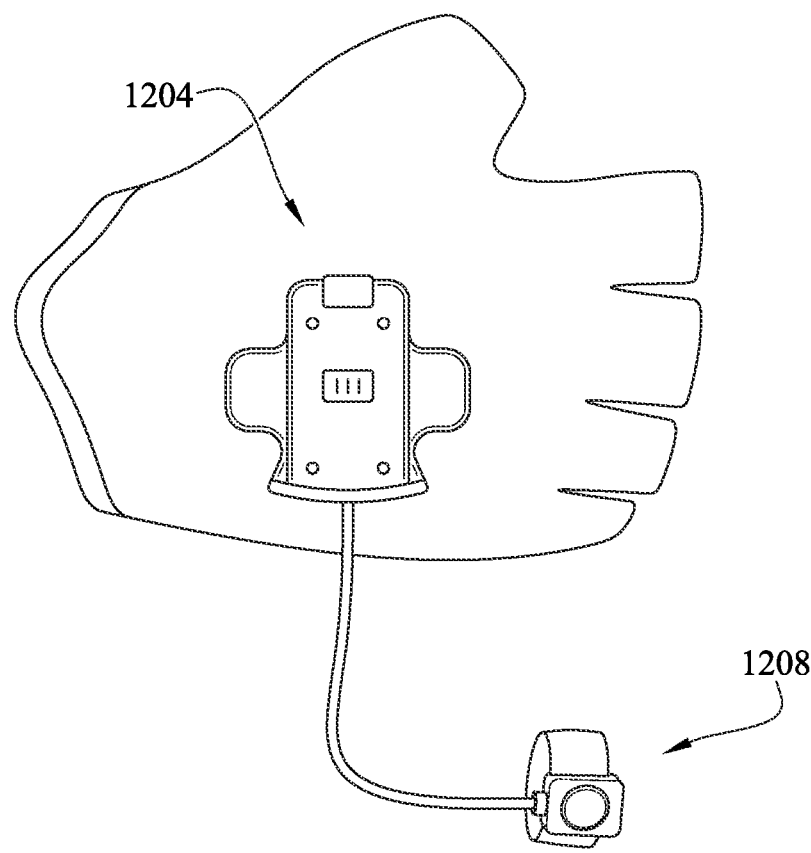
FIGS. 12A-12D show the similar mounts being integrated into gloves that may be worn with the scanner unit attached to a mount on the wrist and a trigger button worn on a finger.
Figure 12B:
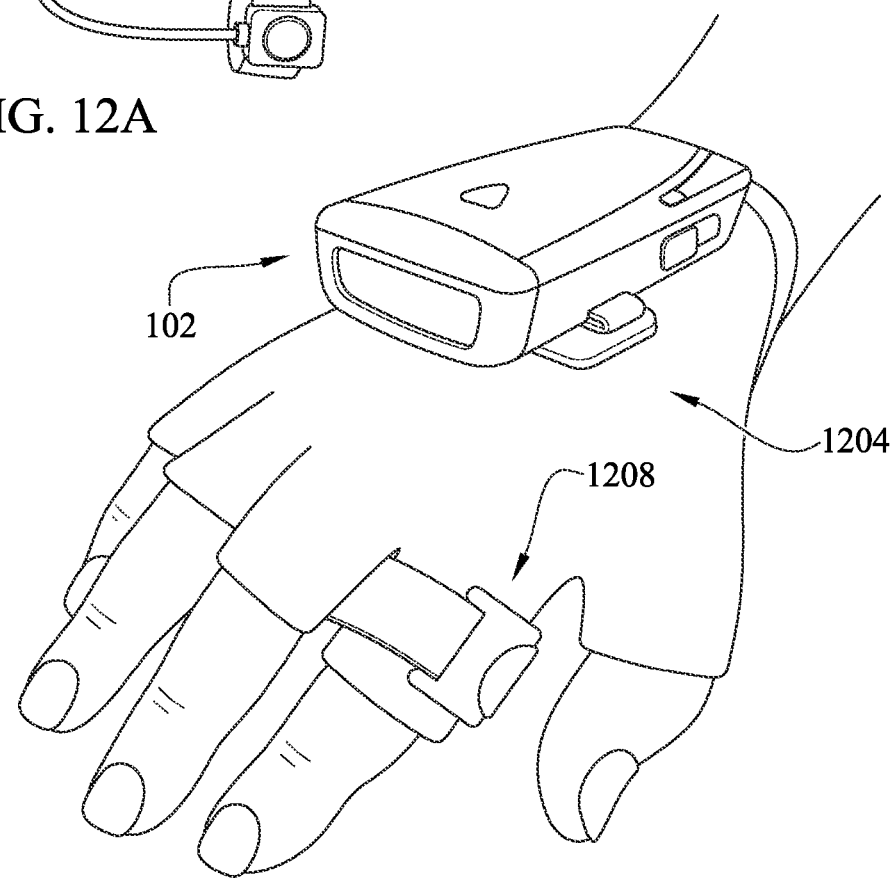
Figure 12C:
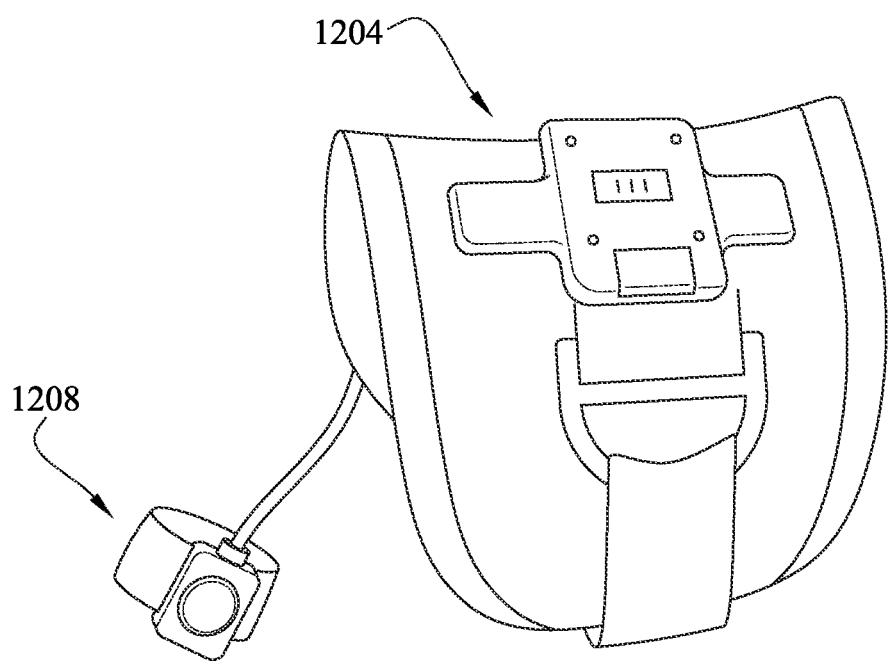
Figure 12D:
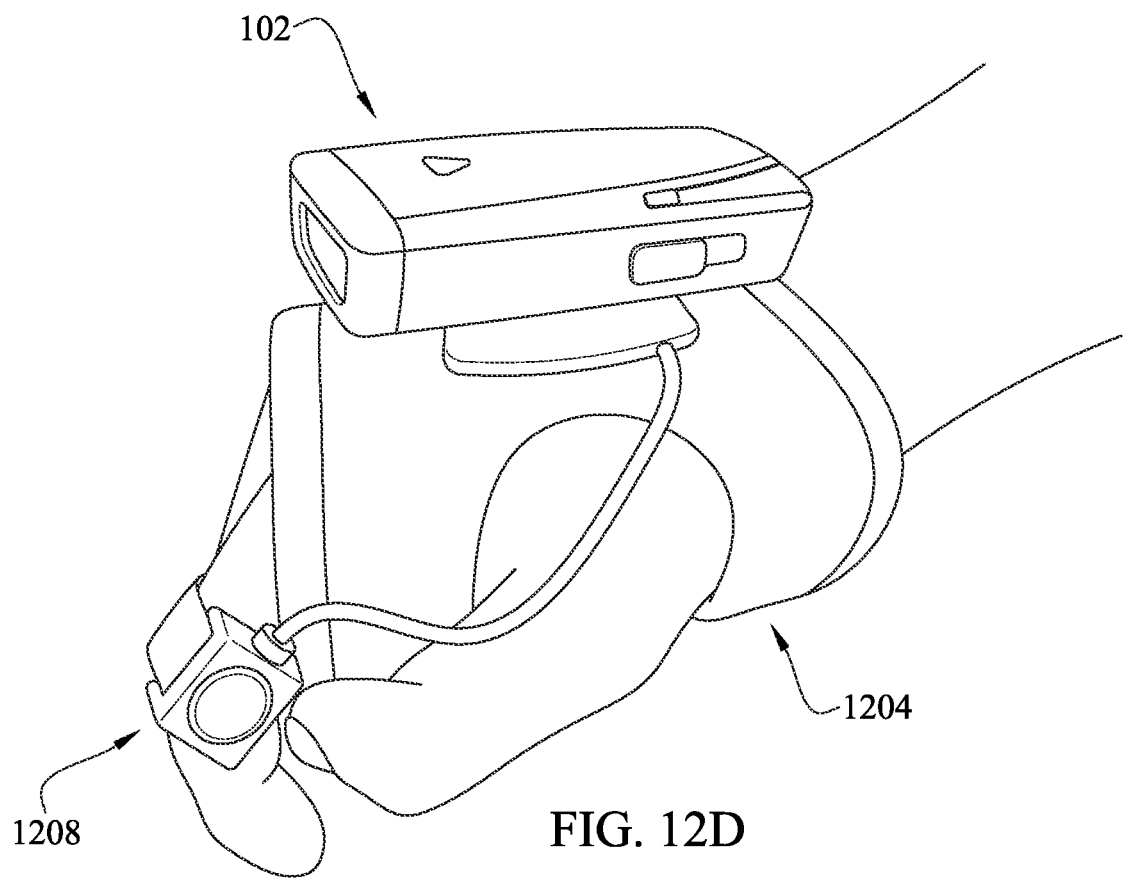

FIGS. 12A-12D show the similar mounts being integrated into gloves that may be worn with the scanner unit 102 attached to a trigger assembly mount on the wrist (or top of the hand) and a separate trigger button 1208 being worn on a finger. The trigger assembly mount 1204 may be configured to be attached and detached from the scanner unit 102 as discussed above, including locking mechanisms and the ability to be attached in either a right-hand configuration or a left-hand configuration. The trigger button 1208 may be pressed by the user's thumb. The trigger button 1208 and the trigger mount assembly 1204 may communicate with each other via a wired connection (as shown) or a wireless connection in some embodiments. The trigger mount assembly 1204 may then route any control signals or other communication information to the scanner unit 102. For example, FIGS. 12A, 12B show the trigger mount assembly 1204 being incorporated into a glove with cutout finger holes. FIGS. 12C, 12D show the trigger mount assembly 1204 being incorporated into a hand strap in which the strap connects to the back of the hand and around the thumb without individual finger holes. The scanner unit 102, therefore, may rest on top of the user's hand. Other embodiments are also contemplated in which the trigger assembly mount 1204 may be integrated into other types of wearable items and/or stands.

Figure 13A:
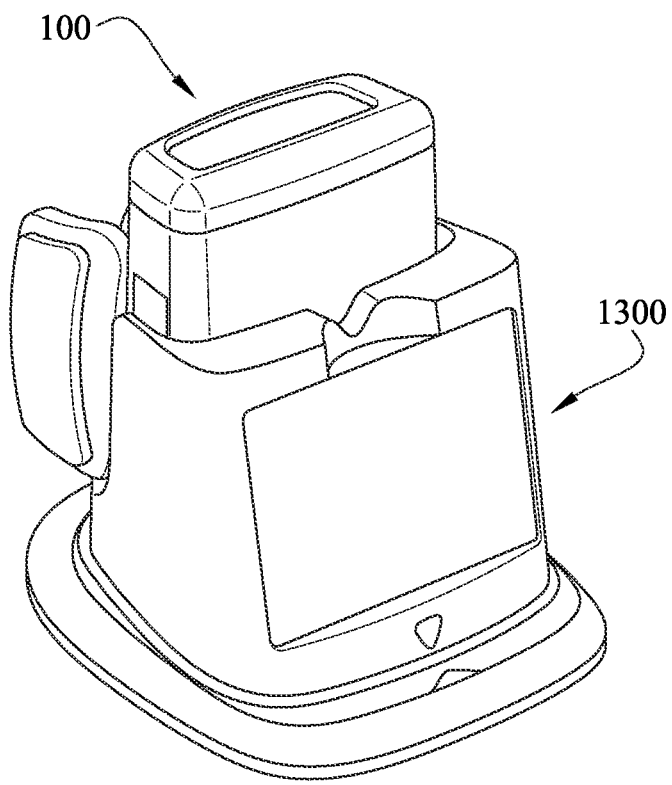
FIGS. 13A and 13B show a single charging station configured to receive a single wearable scanner.
Figure 13B:
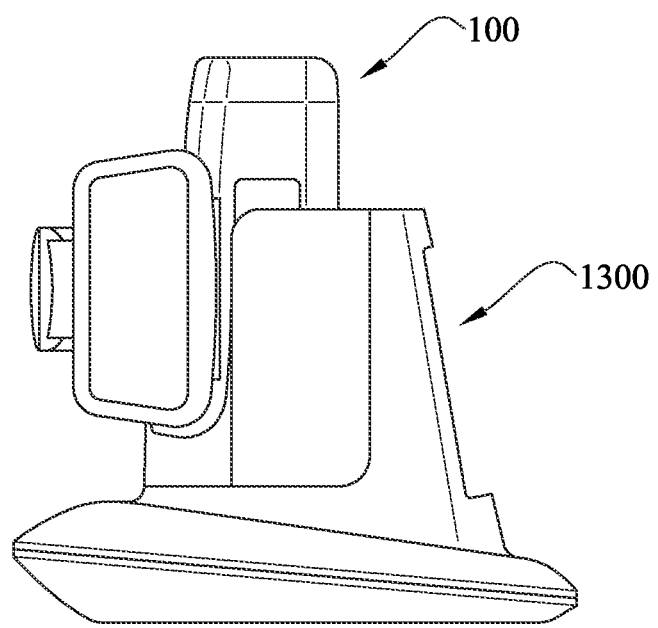
Figure 14:
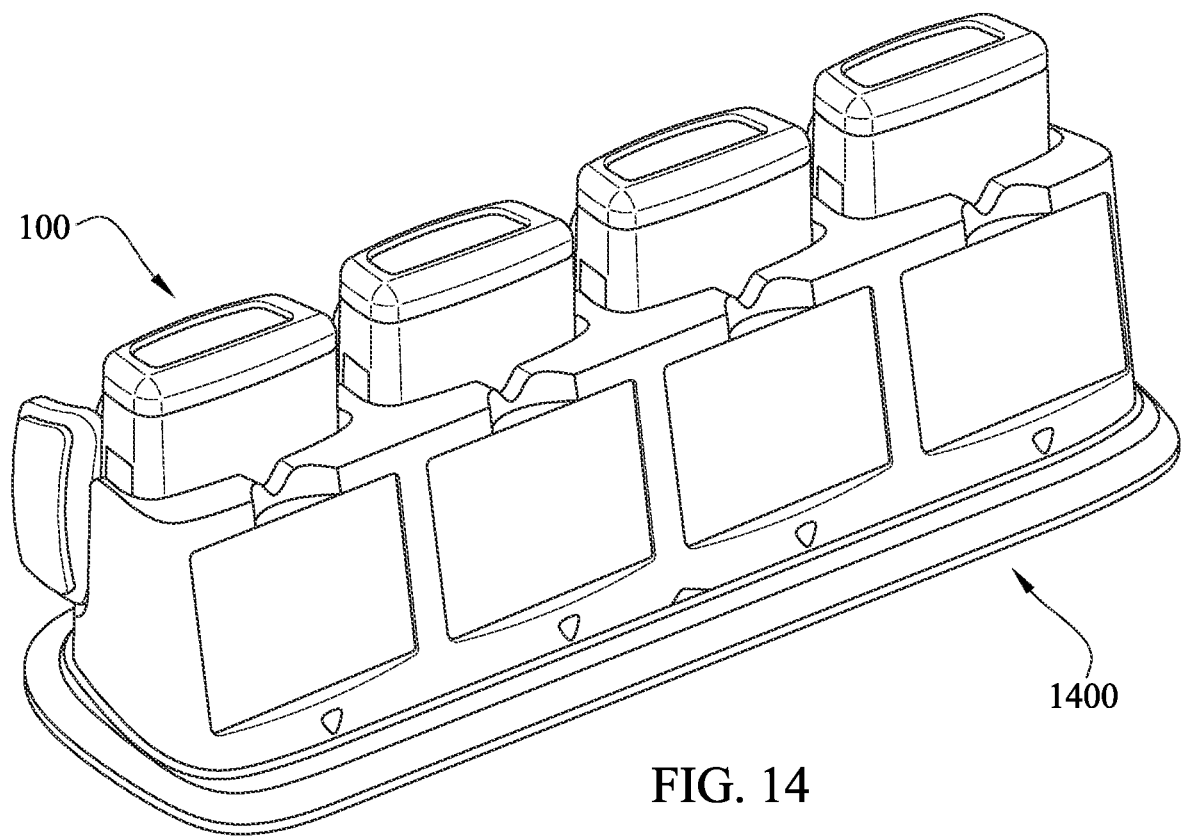
FIG. 14 shows a charging station configured to receive multiple wearable scanners for simultaneous charging.
Figure 15A:
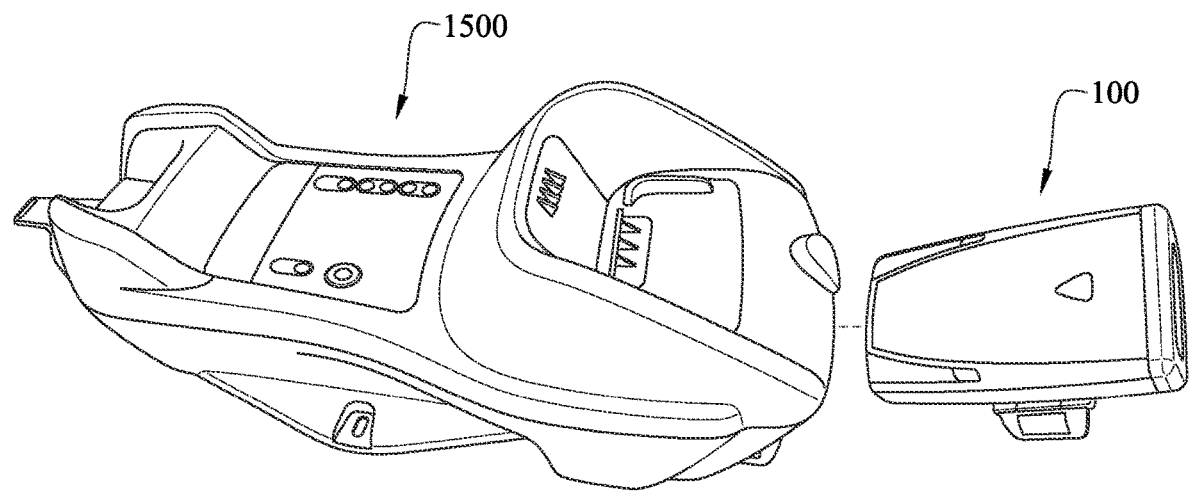
FIGS. 15A and 15B show a charging station that is configured as a dual-purpose charging station that charges both the wearable scanner as well as another device such as a handheld scanner.
Figure 15B:
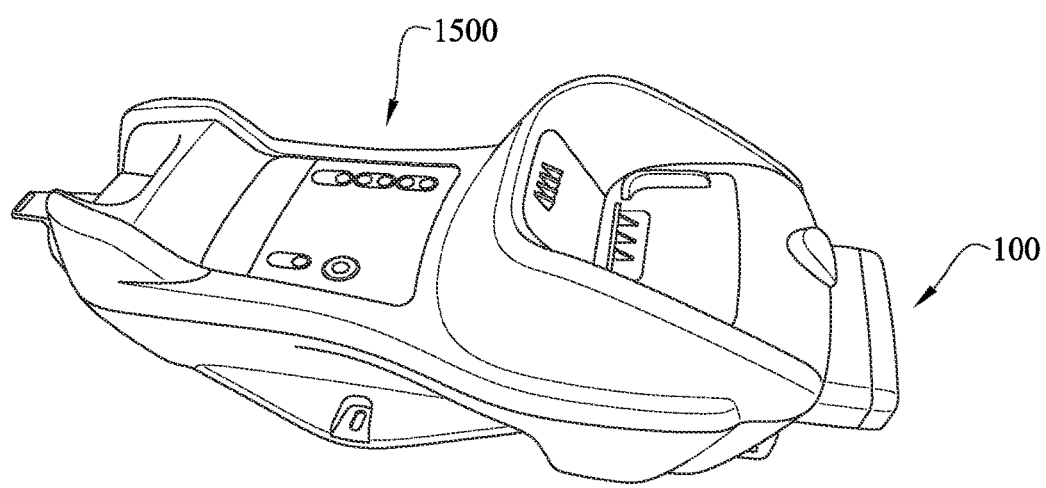

Embodiments of the disclosure may further include charging stations. For example, FIGS. 13A and 13B show a single charging station 1300 configured to receive a single wearable scanner 100. FIG. 14 shows a charging station 1400 configured to receive multiple wearable scanners 100 for simultaneous charging. FIGS. 15A and 15B show a charging station 1500 that is configured as a dual-purpose charging station that charges both the wearable scanner 100 as well as another device such as a handheld scanner. In each case, the wearable scanner 100 may be received into a docking area (e.g., cradle) that establishes electrical contacts for wired charging of the battery pack therein. In some embodiments, the docking area may facilitate alignment of wireless charging coils to perform wireless power transfer (e.g., inductive charging). Data transfer may also be performed with the charging stations (e.g., wired and/or wirelessly). Wearable scanners 100 may be inserted into the docking area with both the scanner unit 102 and the trigger assembly 104 attached, the scanner unit 102 alone, or by removal of the battery pack in various embodiments thereof.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

What is claimed is:

1. A wearable scanner comprising:
   a scanner unit including:
      an upper enclosure and a lower enclosure that are detachable from each other; and
      a scan engine mount assembly and a scan engine mounted thereto that is configured to read and decode an identifier on an object, wherein the scan engine assembly includes mounting locations that engage with fasteners to mount be mounted to both the upper enclosure and the lower enclosure; and
   a trigger assembly configured to be attached to and detached from the wearable scanner, and to be worn by a body part of a user, the trigger assembly including:
      a trigger switch to control operational functions of the wearable scanner responsive to an input from the user; and
      a strap ring that contacts the spring latch, wherein the strap ring is rotated inward to move the spring latch downward and disengage the spring latch with the corresponding cavity in the bottom enclosure when detaching the scanner unit from the trigger assembly.

2. The wearable scanner of claim 1, wherein the scan engine includes one or more imagers, light sources, processors, or memory, or any combination thereof.

3. The wearable scanner of claim 1, wherein a top portion of the trigger assembly is configured to attach to the underside of the scanner unit to establish electrical connections therebetween and provide a support for the scanner unit when worn by the user.

4. The wearable scanner of claim 3, wherein the scanner unit includes a removable side latch and an internal slot within which a battery pack is inserted.

5. The wearable scanner of claim 3, wherein the bottom enclosure of the scanner unit includes a recessed portion that mates with a corresponding protruding portion of the trigger assembly to attached thereto.

6. The wearable scanner of claim 5, wherein the recessed portion includes a first cavity proximate a first end thereof to engage with the spring latch on the trigger assembly.

7. The wearable scanner of claim 6, wherein the recessed portion includes a second cavity proximate a second end thereof to engage with the spring latch on the trigger assembly to enable the scanner unit to be attachable in either a right hand or a left hand configuration.

8. The wearable scanner of claim 1, wherein the trigger assembly is configured to be activated by a thumb when worn by the user.

9. The wearable scanner of claim 1, wherein the trigger assembly is configured to be worn by one or more fingers of the user.

10. The wearable scanner of claim 1, wherein the trigger assembly is incorporated within a glove to be worn on the hand of a user.

11. The wearable scanner of claim 1, wherein the trigger assembly is incorporated within a glove to be worn on the hand of a user.

12. A wearable scanner comprising:
    a scanner unit including:
       an upper enclosure and a lower enclosure that are detachable from each other; and a scan engine mount assembly and a scan engine mounted thereto that is configured to read and decode an identifier on an object, wherein the scan engine assembly includes mounting location that engage with fasteners to mount be mounted to both the upper enclosure and the lower enclosure; and a trigger assembly configured to be attached to and detached from the wearable scanner, and to be worn by a body part of a user, the trigger assembly including:

a trigger switch to control operational functions of the wearable scanner responsive to an input from the user; and a strap ring that contacts a spring latch, wherein the strap ring is pushed outward to engage the spring latch with the corresponding cavity in the bottom enclosure and prevent the spring latch from moving downward when attaching the scanner unit with the trigger assembly.

13. The wearable scanner of claim 1, wherein the trigger switch of the trigger assembly is operably coupled with contact springs via a connector cable.

14. A wearable scanner comprising:
a scanner unit including:
an upper enclosure and a lower enclosure that are detachable from each other; and a scan engine mount assembly and a scan engine mounted thereto that is configured to read and decode an identifier on an object, wherein the scan engine assembly includes mounting location that engage with fasteners to mount be mounted to both the upper enclosure and the lower enclosure; and a trigger assembly configured to be attached to and detached from the wearable scanner, and to be worn by a body part of a user, the trigger assembly including:

a trigger switch to control operational functions of the wearable scanner responsive to an input from the user; and a hinge plate having arms, a connector spring, and rotational pins.

15. The wearable scanner of claim 14, wherein the trigger assembly further comprises a seal, wherein the connector spring is elevated vertically by the hinge plate to create pressure for the seal against the bottom enclosure and for the connector spring against electrical contacts when the trigger assembly is at a final position in the scanner bottom enclosure.

16. The wearable scanner of claim 15, wherein the seal and the connector spring retract downward when the trigger assembly detached from of the scanner unit.

17. The wearable scanner of claim 16, wherein the hinge plate moves up or down when the hinge plate arms are pushed by side ribs on the bottom enclosure of the scanner unit.

18. The wearable scanner of claim 17, wherein the hinge plate arms have ramps configured to move up or down when engaged with a front surface of the side ribs on the bottom enclosure of the scanner unit.

19. The wearable scanner of claim 17, wherein the hinge plate includes an integrated spring to maintain the seal and the connectors pushed downward when the trigger assembly is moving along an outside portion the bottom enclosure of the scanner unit to avoid the connectors from scraping on the bottom enclosure surface of the scanner unit during insertion.

20. The wearable scanner of claim 14, wherein the trigger assembly includes:
a trigger assembly mount that engages with the scanner unit; and
a trigger button that includes the trigger switch, wherein the trigger button communicates with the trigger assembly mount via at least one of a wired or wireless connection.

* * * * *